United States Patent
Zheng et al.

(10) Patent No.: US 12,332,827 B2
(45) Date of Patent: Jun. 17, 2025

(54) DATA TRANSMISSION METHOD, DEVICE, NETWORK SYSTEM, AND STORAGE MEDIUM

(71) Applicant: ALIBABA GROUP HOLDING LIMITED, Grand Cayman (KY)

(72) Inventors: Xiao Zheng, Hangzhou (CN); Weinan Li, Hangzhou (CN); Tao Lyu, Hangzhou (CN); Xin Long, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 65 days.

(21) Appl. No.: 18/034,357

(22) PCT Filed: Oct. 25, 2021

(86) PCT No.: PCT/CN2021/126035
§ 371 (c)(1),
(2) Date: Apr. 27, 2023

(87) PCT Pub. No.: WO2022/089352
PCT Pub. Date: May 5, 2022

(65) Prior Publication Data
US 2023/0409506 A1    Dec. 21, 2023

(30) Foreign Application Priority Data

Oct. 30, 2020    (CN) .......................... 202011198117.7

(51) Int. Cl.
*G06F 13/42* (2006.01)
*G06F 13/36* (2006.01)
(Continued)

(52) U.S. Cl.
CPC ........ *G06F 13/4221* (2013.01); *G06F 13/362* (2013.01); *G06F 13/4022* (2013.01)

(58) Field of Classification Search
CPC . G06F 13/4221; G06F 13/362; G06F 13/4022
See application file for complete search history.

(56) References Cited

U.S. PATENT DOCUMENTS

| | | | |
|---|---|---|---|
| 8,775,687 B1 * | 7/2014 | Liu | G06F 3/0613 710/5 |
| 2006/0179173 A1 * | 8/2006 | Bockhaus | G06F 12/1054 711/E12.063 |

(Continued)

FOREIGN PATENT DOCUMENTS

| | | |
|---|---|---|
| CN | 101882126 A | 11/2010 |
| CN | 103117929 A | 5/2013 |

(Continued)

OTHER PUBLICATIONS

International Search Report dated Jan. 26, 2022, in connection with International Application No. PCT/CN2021/126035.

*Primary Examiner* — Henry Tsai
*Assistant Examiner* — Harry Z Wang
(74) *Attorney, Agent, or Firm* — Wolf, Greenfield & Sacks, P.C.

(57) ABSTRACT

A data transmission method, a device, a network system, and a storage medium. According to the method, a PCIe request end requests an application scenario of a data fragment from a PCIe destination end according to a Non-Posted data transmission mode; and on a PCIe link, the Non-Posted data transmission mode is converted, without the perception of the PCIe request end and PCIe destination end, into a Posted data transmission mode by means of pre-reading, so that the delay of the PCIe link is reduced, and the utilization of bandwidth of the PCIe link is improved.

20 Claims, 10 Drawing Sheets

(51) Int. Cl.
*G06F 13/362* (2006.01)
*G06F 13/40* (2006.01)

(56) References Cited

U.S. PATENT DOCUMENTS

| | | | | |
|---|---|---|---|---|
| 2012/0311212 A1* | 12/2012 | Bender | ............... | G06F 13/364 |
| | | | | 710/113 |
| 2013/0073766 A1* | 3/2013 | Gregg | ............... | G06F 13/385 |
| | | | | 710/300 |
| 2013/0346538 A1* | 12/2013 | Blinick | ............... | G06F 12/084 |
| | | | | 709/213 |
| 2015/0286439 A1* | 10/2015 | Takagi | ............... | G06F 3/067 |
| | | | | 711/162 |
| 2018/0004668 A1* | 1/2018 | Azizi | ............... | G06F 3/0608 |
| 2019/0179784 A1* | 6/2019 | Tsuji | ............... | G06F 13/4031 |
| 2019/0361763 A1 | 11/2019 | Bakshi et al. | | |

FOREIGN PATENT DOCUMENTS

| | | |
|---|---|---|
| CN | 104750634 A | 7/2015 |
| CN | 113297117 A | 8/2021 |

\* cited by examiner

DATA TRANSMISSION METHOD, DEVICE, NETWORK SYSTEM, AND STORAGE MEDIUM

This Application is a national stage filing under 35 U.S.C. 371 of International Patent Application Serial No. PCT/CN2021/126035, filed Oct. 25, 2021, entitled "DATA TRANSMISSION METHOD, DEVICE, NETWORK SYSTEM, AND STORAGE MEDIUM". Foreign priority benefits are claimed under 35 U.S.C. § 119(a)-(d) or 35 U.S.C. § 365(b) of Chinese application number 202011198117.7, filed Oct. 30, 2020. The entire contents of these applications are incorporated herein by reference in their entirety.

TECHNICAL FIELD

The present application relates to the field of computer technology, and in particular to a data transmission method, a device, a network system, and a storage medium.

BACKGROUND

The Peripheral Component Interconnect express (PCIe) bus system is a local bus system designed to communicate storage spaces of a memory and a peripheral equipment. In the PCIe bus system, data transmission is performed in the form of Transaction Layer Packet (TLP). For example, when one PCIe device needs to read the memory of a host or another PCIe device, it may send a TLP carrying a read request (Read TLP) to the opposite end. After receiving the Read TLP, the opposite end will reply a Completion TLP as a response message.

In order to ensure the stability of data on a PCIe bus, the PCIe device will ensure that the total number of Read TLPs currently on the PCIe bus is not more than a maximum number, for example, not more than 256. When the number of the sent Read TLPs is greater than 256, the PCIe device will stop sending Read TLPs, and will continue to send the Read TLP only after the Completion TLP is returned. This will reduce bandwidth utilization of the PCIe bus, especially as the bandwidth of the PCIe bus increases and the routing delay on the PCIe bus increases, the bandwidth utilization of the PCIe bus is prone to a cliff-like drop.

SUMMARY

Multiple aspects of the present application provide a data transmission method, a device, a network system, and a storage medium, to reduce data transmission delay and increase bandwidth utilization of the PCIe bus.

An embodiment of the present application provides a data transmission method, applied to a first processing device located on a PCIe link. The data transmission method includes: receiving a first read request, which is sent by a PCIe request end in a Non-Posted data transmission mode, wherein the first request is used for requesting a first data segment from a PCIe destination end; in a case where the first data segment is not hit locally, sending a pre-read request to a second processing device located on the PCIe link, to instruct the second processing device to provide, in a Posted data transmission mode in advance, multiple data segments of the PCIe destination end to the first processing device, wherein the multiple data segments include the first data segment; and saving locally the multiple data segments provided by the second processing device, and returning the first data segment, as response data of the first read request, to the PCIe request end.

An embodiment of the present application also provides a data transmission method, applied to a second processing device located on a PCIe link. The data transmission method includes: receiving a pre-read request, which is sent by a first processing device located on the PCIe link according to a first read request, wherein the first read request is sent by a PCIe request end in a Non-Posted data transmission mode, and is used for requesting a first data segment from a PCIe destination end; reading, according to the pre-read request, multiple data segments including the first data segment from the PCIe destination end; providing the multiple data segments including the first data segment to the first processing device in a Posted data transmission mode.

An embodiment of the present application also provides a network system, including: a PCIe request end, a PCIe destination end, and a multistage PCIe switching device connected between the PCIe request end and the PCIe destination end; the multistage PCIe switching device at least includes a first PCIe switching device and a second PCIe switching device; the first PCIe switching device is configured for receiving a first read request, which is sent by the PCIe request end in a Non-Posted data transmission mode, wherein the first read request is used for requesting a first data segment from the PCIe destination end; in a case where the first data segment is not hit locally, sending a pre-read request to the second PCIe switching device; and saving locally multiple data segments, including the first data segment, provided by the second PCIe switching device, and returning the first data segment, as response data of the first read request, to the PCIe request end; and the second PCIe switching device is configured for receiving the pre-read request, and reading, according to the pre-read request, the multiple data segments from the PCIe destination end; and providing the multiple data segments to the first PCIe switching device in a Posted data transmission mode.

An embodiment of the present application also provides a network system, including: a PCIe request end, a PCIe destination end, a first transmission mode conversion device connected to the PCIe request end, a second transmission mode conversion device connected to the PCIe destination end, and a PCIe switching device connected between the first transmission mode conversion device and the second transmission mode conversion device; the first transmission mode conversion device is configured for receiving a first read request, which is sent by the PCIe request end in a Non-Posted data transmission mode, wherein the first read request is used for requesting a first data segment from the PCIe destination end; in a case where the first data segment is not hit locally, sending a pre-read request to the second transmission mode conversion device; and saving locally multiple data segments, including the first data segment, provided by the second transmission mode conversion device, and returning the first data segment, as response data of the first read request, to the PCIe request end; and the second transmission mode conversion device is configured for receiving the pre-read request, and reading, according to the pre-read request, the multiple data segments from the PCIe destination end; and providing the multiple data segments to the first transmission mode conversion device in a Posted data transmission mode.

An embodiment of the present application also provides a PCIe switching device, which can be implemented as a first PCIe switching device on a PCIe link. The PCIe switching device includes: a memory and a processor; the memory is configured for storing a computer program; and the processor is coupled with the memory, and is configured for executing the computer program to: receive a first read request, which is sent by a PCIe request end in a Non-Posted data transmission mode, wherein the first read request is used for requesting a first data segment from a PCIe destination end; in a case where the first data segment is not hit locally, send a pre-read request to a second PCIe switching device located on the PCIe link, to instruct the second PCIe switching device to provide, in a Posted data transmission mode in advance, multiple data segments of the PCIe destination end to the first PCIe switching device, wherein the multiple data segments include the first data segment; and save locally the multiple data segments provided by the second PCIe switching device, and returning the first data segment, as response data of the first read request, to the PCIe request end.

An embodiment of the present application also provides a PCIe switching device, which can be implemented as a second PCIe switching device on a PCIe link. The PCIe switching device includes: a memory and a processor; the memory is configured for storing a computer program; and the processor is coupled with the memory, and is configured for executing the computer program to: receive a pre-read request, which is sent by a first PCIe switching device located on the PCIe link according to a first read request, wherein the first read request is sent by a PCIe request end in a Non-Posted data transmission mode, and is used for requesting a first data segment from a PCIe destination end; read, according to the pre-read request, multiple data segments including the first data segment from the PCIe destination end; and provide the multiple data segments including the first data segment to the first PCIe switching device in a Posted data transmission mode.

An embodiment of the present application also provides a computer-readable storage medium storing a computer program. The computer program, when executed by a processor, causes the processor to implement steps of any one of the methods provided by the embodiments of the present application.

In the embodiment of the present application, in a case where a PCIe request end requests a first data segment from a PCIe destination end in a Non-Posted data transmission mode, on a PCIe link, a first processing device intercepts a read request sent by the PCIe request end, and sends a pre-read request to a second processing device, so that the second processing device reads multiple data segments including the first data segment from the PCIe destination end in advance and provides them to the first processing device in a Posted data transmission mode. In this way, the first processing device can locally hit the data segments for multiple subsequent read requests of the PCIe request end and return them as response data. In the embodiment of the present application, the Non-Posted data transmission mode of the local end can be converted into the Posted data transmission mode of the opposite end in a case where the PCIe request end and the PCIe destination end are unaware. By virtue of the advantage that the first processing device is closer to the PCIe request end, the read request of the PCIe request end can be quickly responded, and the delay is low. Therefore, there will not be too many unresponsive read requests on the PCIe link, and the PCIe request end can continuously send read requests, thereby increasing the bandwidth utilization of the PCIe link.

BRIEF DESCRIPTION OF THE DRAWINGS

The accompanying drawings described here are used to provide further understanding of the present application, and constitute a part of the present application. The example embodiments of the present application and the description of the example embodiments are used to explain the present application, and do not constitute any improper limitation to the present application. In the drawings.

DETAILED DESCRIPTION

To make the objectives, technical solutions, and advantages of the present application clearer, the technical solutions of the present application will be described clearly with reference to specific embodiments of the present application and the corresponding accompanying drawings below. Apparently, the described embodiments are merely some of the embodiments of the present application, rather than all of the embodiments of the present application. Based on the embodiments of the present application, all other embodiments obtained by a person of ordinary skill in the art without creative efforts shall fall within the protection scope of the present application.

Figure 1A:
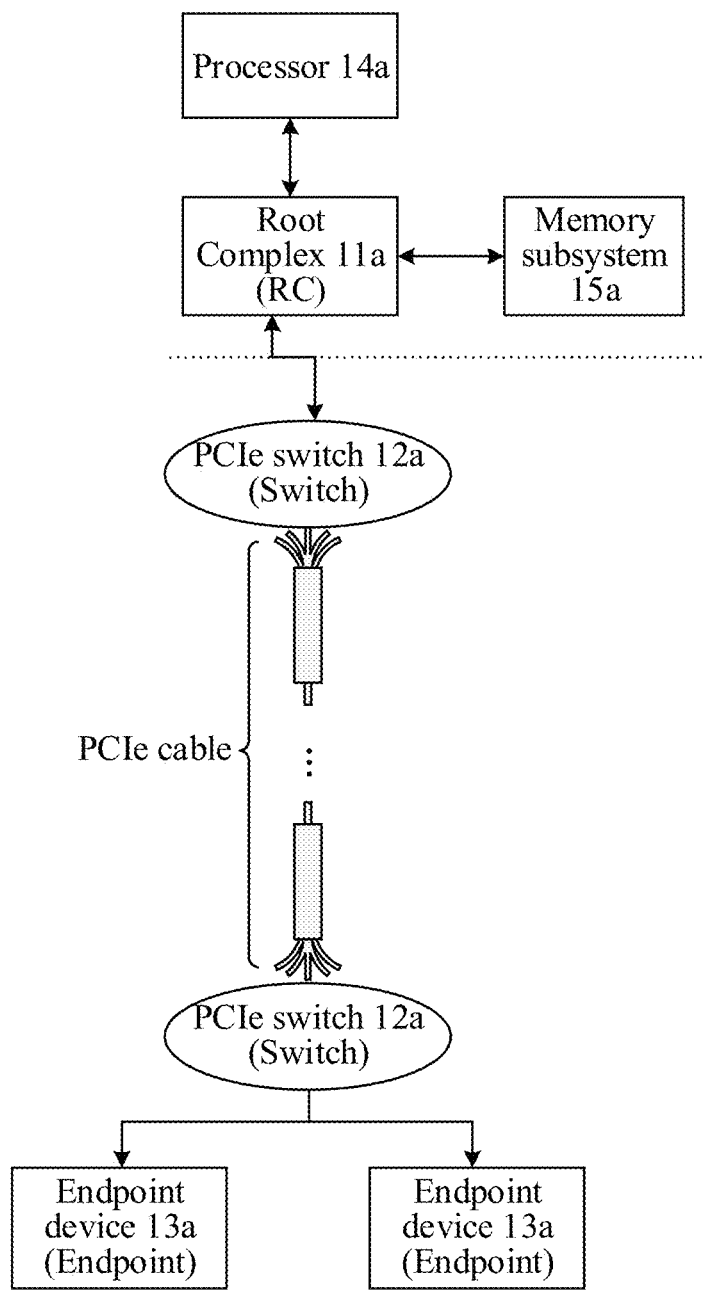
FIG. 1a is a schematic structural diagram of a network system provided by an exemplary embodiment of the present application.

The PCIe bus is a high-speed serial computer expansion bus standard, which adopts an end-to-end data transmission mode, can allocate independent channel resources for all devices in a system, fully guarantee the bandwidth of the devices, and improve data transmission rate. The PCIe bus has good flexibility, and one PCIe link can be implemented, through PCIe switching devices, as a multi-link (such as 2-link, 4-link, 8-link or 32-link, etc.) mode. As shown in FIG. 1a, it is a network system structure implemented based on a PCIe bus provided by an embodiment of the present application. The network system structure includes: a Root Complex (RC) 11a, a multistage PCIe switch (Switch) 12a and various endpoint devices (EndPoint) 13a. The RC 11a may be inherited in a northbridge chip, and is used to connect a processor 14a and a memory subsystem 15a to various IO devices. The RC 11a is connected to an upstream port of a first-stage switch, a downstream port of the first-stage switch is connected to a next-stage switch, and so on, until a downstream port of a last-stage switch is connected to the endpoint devices 13a. The endpoint devices 13a may be various terminal devices such as mobile phones and notebooks, or may also be various computing chips such as CPUs and GPUs, which are not limited herein.

In FIG. 1a, the PCIe switching devices connected between the Root Complex 11a and the endpoint devices 13a being switches is taken as an example, and the switches are remotely connected through a PCIe cable, but it is not limited to this. For example, in another network system implemented based on the PCIe bus shown in FIG. 1b, the PCIe switching devices connected between the Root Complex 11a and the endpoint devices 13a include Data Processing Unit (DPU) devices 16a in addition to the switches 12a, and the DPU devices 16a are remotely connected through a PCIe cable. For another example, in another network system implemented based on the PCIe bus shown in FIG. 1c, the PCIe switching devices connected between the Root Complex 11a and the endpoint devices 13a include DPU devices 16a in addition to the switches 12a, and the DPU devices 16a are connected through the Internet. The DPU is a system on a chip, or SOC, and is a new type of programmable processor, which supports customizing more complex switching logic, and may also perform various data processing before data exchange.

Figure 1B:
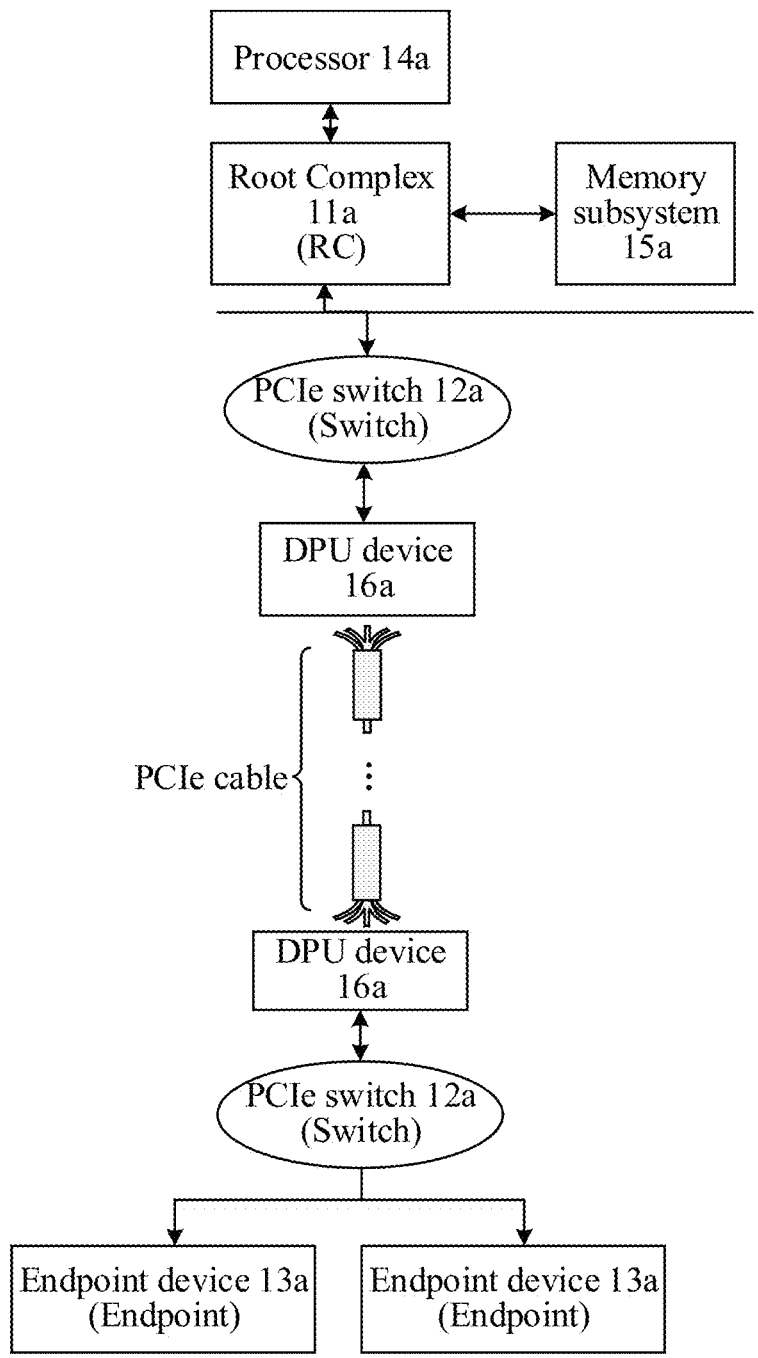
FIG. 1b is a schematic structural diagram of another network system provided by an exemplary embodiment of the present application.
Figure 1C:
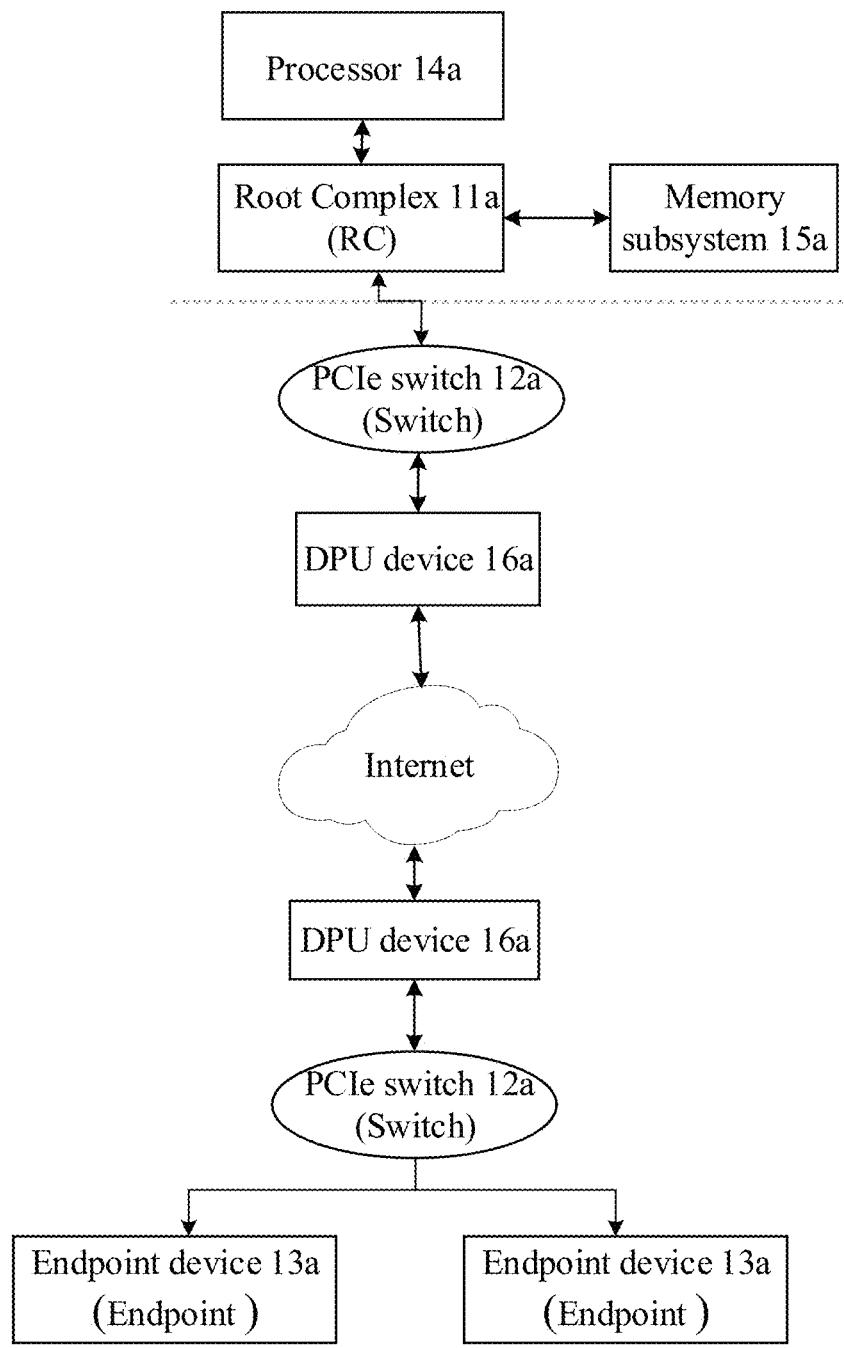
FIG. 1c is a schematic structural diagram of another network system provided by an exemplary embodiment of the present application.

In the network systems implemented based on the PCIe bus shown in FIG. 1a to FIG. 1c, data transmission may be performed between the Root Complex 11a and the various endpoint devices 13a; and data transmission may also be performed between one endpoint device 13a and another endpoint device 13a. From the point of view of data transmission, devices with data transmission requirements at two ends of the PCIe link may be referred to as a PCIe request end and a PCIe destination end respectively. In the network systems shown in FIG. 1a to FIG. 1c, the Root Complex 11a may be implemented as the PCIe request end, and the endpoint devices 13a may be implemented as the PCIe destination end; or, the Root Complex 11a may be implemented as the PCIe destination end, and the endpoint devices 13a may be implemented as the PCIe request end; correspondingly, the switches 12a and the DPU devices 16a between the Root Complex 11a and the endpoint devices 13a may be implemented as a multistage PCIe switching device between the PCIe request end and the PCIe destination end. In addition, the PCIe request end may also be an endpoint device 13a at one end of the PCIe link, and the PCIe destination end may be an endpoint device 13a at the other end of the PCIe link.

Regardless of which end of the PCIe link the PCIe request end and the PCIe destination end are, in this embodiment, the PCIe bus supports two data transmission modes, one is a Posted data transmission mode, and the other is a Non-Posted data transmission mode.

The Posted data transmission mode: A PCIe request end initiates a Posted Request to a PCIe destination end. After the Posted Request reaches a PCIe bridge, the PCIe request end may terminate the transaction without waiting for the PCIe destination end to return response data. Because a PCIe bus has a flow control function, the PCIe request end will determine, through the credits of the opposite end, whether the PCIe request end may send the Posted Request to the PCIe destination end. If the PCIe request end may send the Posted Request to the PCIe destination end, the Posted Request will be sent, and the Posted Request may be guaranteed to be sent successfully, so the reliability of data transmission can be guaranteed without the PCIe destination end responding to the Posted Request. Corresponding to the transaction types supported by the PCIe bus, the Posted Request is usually a write request, for example, it may be a memory write request initiated by the PCIe request end to the PCIe destination end.

The Non-Posted data transmission mode: Contrary to the Posted data transmission mode, a PCIe request end initiates a Non-Posted Request to a PCIe destination end, and the PCIe request end may terminate the transaction only after the Non-Posted Request reaches the PCIe destination end. That is, the PCIe destination end needs to return response data to the PCIe request end, to notify the PCIe request end that the Non-Posted Request has succeeded, thereby ensuring the reliability of data transmission. Corresponding to the transaction types supported by the PCIe bus, the Non-Posted Request is usually a read request, for example, it may be a memory read request, an IO read request or a configuration read request, which is initiated by the PCIe request end to the PCIe destination end.

In order to ensure the stability of data transmission of the PCIe link, the PCIe request end will ensure that the total number of unresponsive read requests (on the fly read requests) on the PCIe link is not more than a maximum number, for example, not more than 256. If the transmission delay between the PCIe request end and the PCIe destination end increases due to various reasons, it will cause a large number of unresponsive requests on the PCIe link. When the maximum number is reached, the PCIe request end will stop sending the read request, and wait for the PCIe destination end to return response data corresponding to the read request. Only when the response data has arrived, the PCIe request end will continue to send the read request. This will reduce the bandwidth utilization of the PCIe bus, especially as the bandwidth of the PCIe bus used increases, for example, the data transmission bandwidth of a PCIe3.0 bus has reached more than 100 Gbps unidirectionally, and the data transmission bandwidth of a PCIe4.0 bus will reach more than 200 Gpbs, so the drop in bandwidth utilization of the PCIe bus will be more pronounced.

Figure 1D:
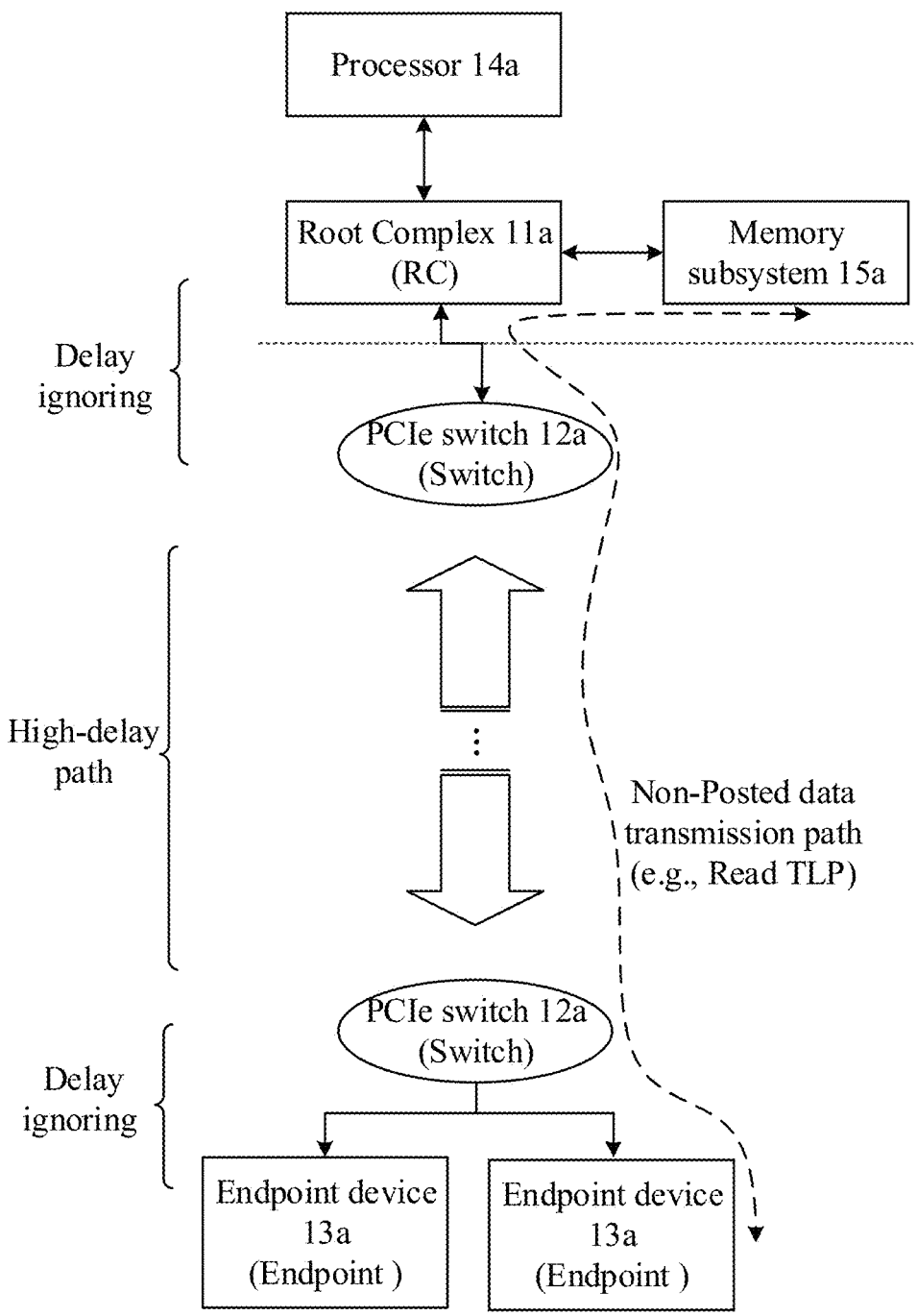
FIG. 1d is a schematic diagram of a data transmission path and delay status on a PCIe link when the solution provided by an embodiment of the present application is not adopted.

Further, in some application scenarios, the routing delay on the PCIe bus will also increase, which will further aggravate the drop in the bandwidth utilization of the PCIe bus, and even cause a cliff-like drop. For example, in the network systems shown in FIG. 1a to FIG. 1c, the delay of the PCIe link will increase due to the presence of a multistage PCIe switching device. For another example, in the network systems shown in FIG. 1b and FIG. 1c, because the DPU devices are added to the PCIe link, the own transmission protocol (or IP network protocol) may be implemented through the DPU devices, and the data on the PCIe link may be packaged and then transmitted for a long distance across cabinets, to realize the extension and pooling of PCIe switching devices, which will also increase the delay of the entire PCIe link. For another example, in the network systems shown in FIG. 1b and FIG. 1c, the DPU devices are remotely connected by using a connection scheme such as PCIe over TCP, PCIe over Fabrics, etc., which will also increase the delay of the PCIe link. In these application scenarios, due to the high delay of the PCIe link, the bandwidth utilization of the PCIe link will be reduced. The endpoint device initiating a memory read request to a Root Complex in a Non-Posted data transmission mode is taken as an example, then the data transmission path and delay status on the PCIe links shown in FIG. 1a to FIG. 1c are shown in FIG. 1d. Of course, the high-delay path shown in FIG. 1d may be caused by using a multistage PCIe switching device, adding DPU devices to achieve cross-cabinet transmission, or using a remote connection scheme such as PCIe over TCP, PCIe over Fabrics, etc., but is not limited to this.

Figure 1E:
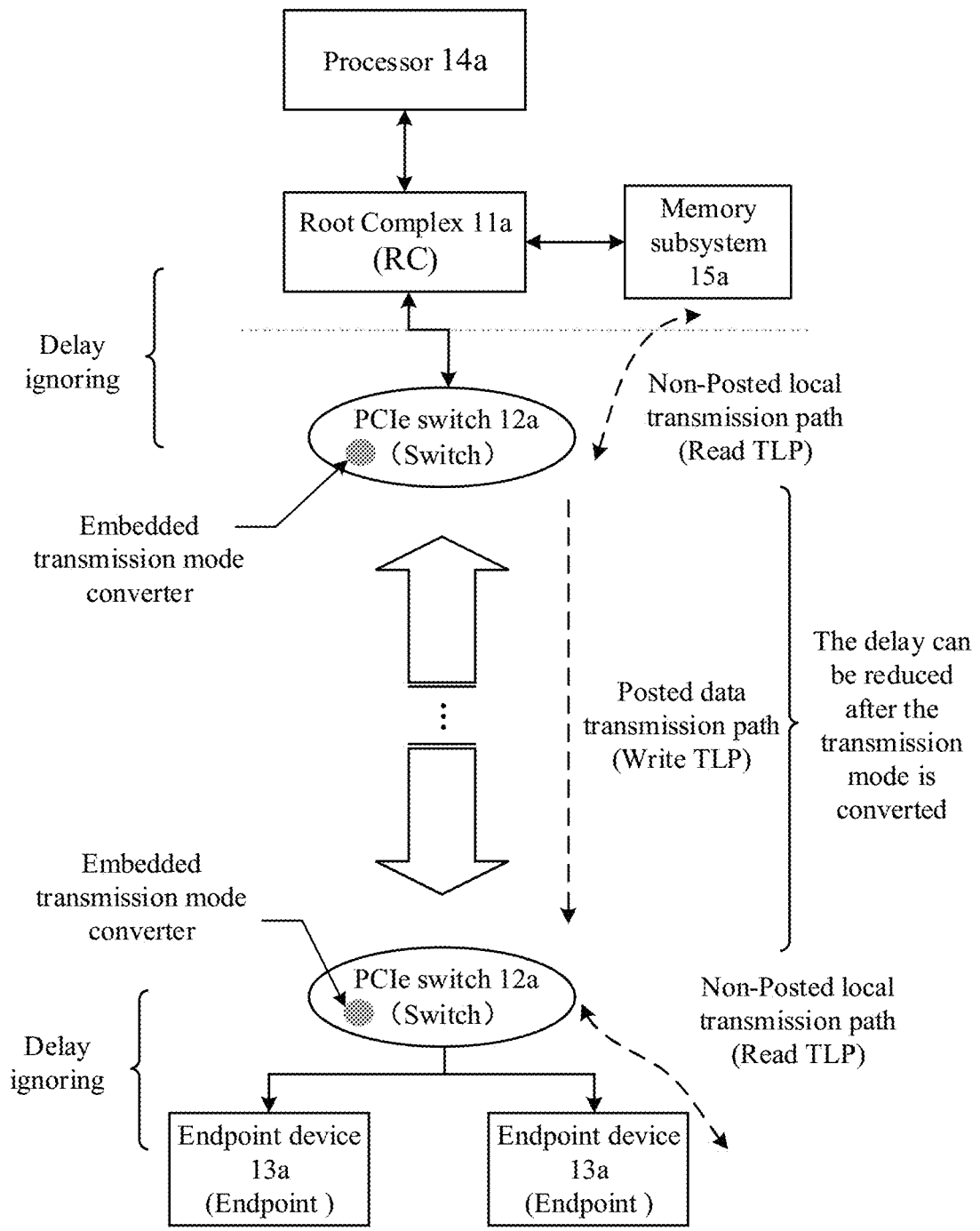
FIG. 1e is a schematic diagram of a data transmission path and delay status on a PCIe link when the solution provided by an embodiment of the present application is adopted.

In an embodiment of the present application, for the application scenario where a PCIe request end requests a data segment from a PCIe destination end in a Non-Posted data transmission mode, the Non-Posted data transmission mode may be converted into a Posted data transmission mode on a PCIe link by pre-reading in a case where the PCIe request end and the PCIe destination end are unaware, which may reduce the delay of the PCIe link and increase the bandwidth utilization of the PCIe link. Following the example shown in FIG. 1d, after adopting the solution provided by the present embodiment, the data transmission path and delay status on the PCIe link are shown in FIG. 1e. As shown in FIG. 1e, the data transmission process on the entire PCIe link includes: a Non-Posted data transmission process (i.e., Non-Posted Read) between the endpoint device 13a and the PCIe switch 12a to which the endpoint device 13a is connected, a Non-Posted data transmission process (i.e., Non-Posted Read) between the Root Complex 11a and the PCIe switch 12a to which the Root Complex 11a is connected, and a Posted data transmission process (i.e., Posted Write) between the two PCIe switches 12a.

In some optional embodiments of the present application, a transmission mode converter is implemented in software, and the transmission mode converter may be implemented by being embedded in a PCIe switching device close to the PCIe request end and a PCIe switching device close to the PCIe destination end on the PCIe link, and is responsible for converting the Non-Posted data transmission mode into the Posted data transmission mode by pre-reading in a case where the PCIe request end and the PCIe destination end are unaware, thereby reducing the delay of the PCIe link, and increasing the bandwidth utilization of the PCIe link.

The PCIe switching device close to the PCIe request end may be a PCIe switching device directly connected to the PCIe request end, or a PCIe switching device indirectly connected to the PCIe request end. Correspondingly, the PCIe switching device close to the PCIe destination end may be a PCIe switching device directly connected to the PCIe destination end, or a PCIe switching device indirectly connected to the PCIe destination end. Regardless of whether the PCIe switching device is directly or indirectly connected to the PCIe request end or the PCIe destination end, it may be implemented as a PCIe switch or a DPU device. In FIG. 1a to FIG. 1c, the PCIe switch 12a directly connected to the endpoint device 13a and the PCIe switch 12a directly connected to the Root Complex 11a are taken as examples for illustration.

Figure 2:
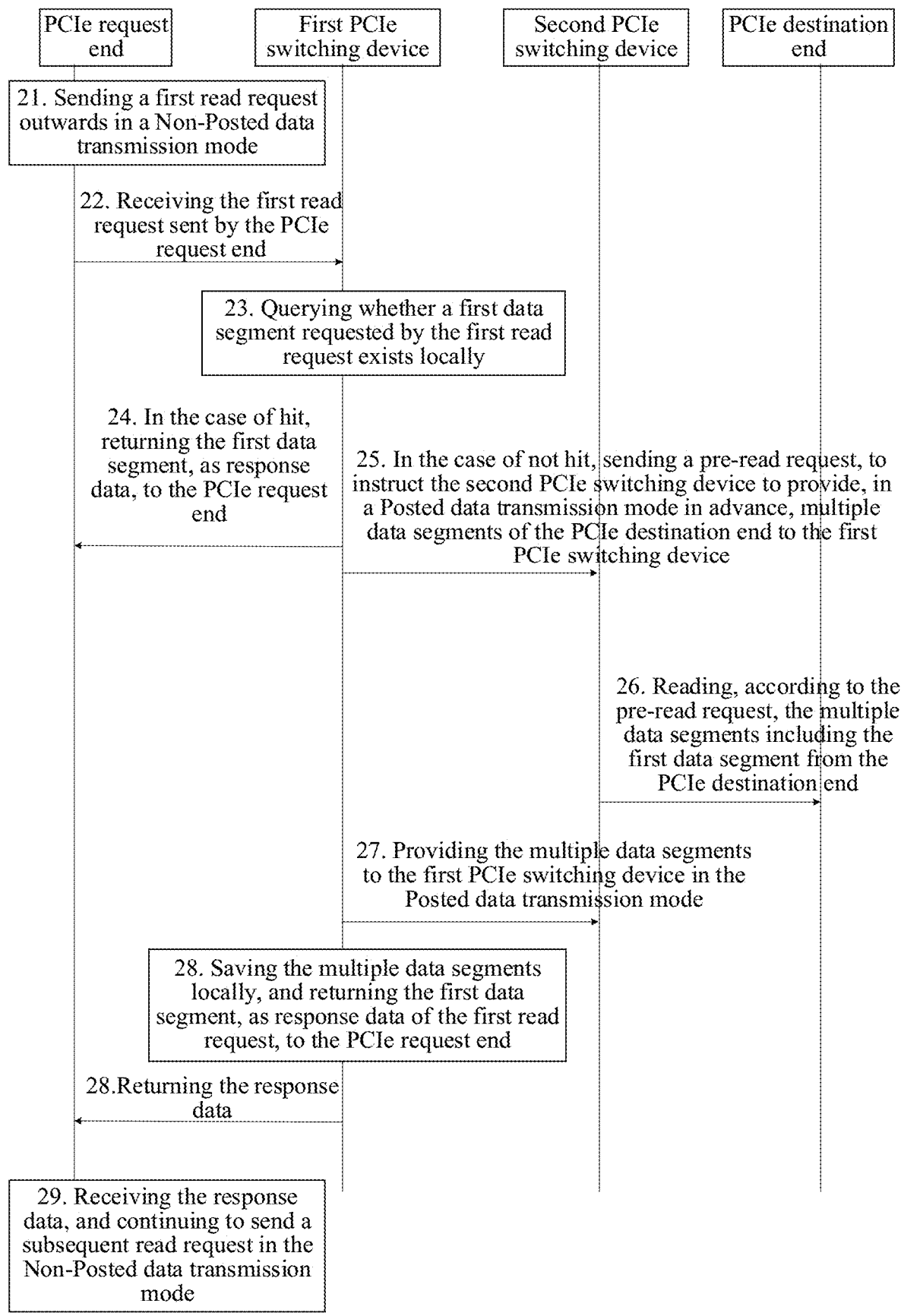
FIG. 2 is a schematic interactive diagram of a data transmission method provided by an exemplary embodiment of the present application.

For ease of description, the PCIe switching device embedded with the transmission mode converter and close to the PCIe request end is referred to as the first PCIe switching device, and the PCIe switching device embedded with the transmission mode converter and close to the PCIe destination end is referred to as the second PCIe switching device. A data transmission process is shown in FIG. 2, including the following steps:

21. The PCIe request end sends a first read request outwards in a Non-Posted data transmission mode, and the first read request is used for requesting a first data segment from the PCIe destination end.
22. The first PCIe switching device receives the first read request, which is sent by the PCIe request end in the Non-Posted data transmission mode.
23. The first PCIe switching device queries whether the first data segment requested by the first read request exists locally; in a case where the first data segment is hit locally, step 24 is executed; and in a case where the first data segment is not hit locally, step 25 is executed.
24. In a case where the first data segment is hit locally, the first PCIe switching device returns the first data segment, as response data of the first read request, to the PCIe request end, and step 29 is jumped to.
25. In a case where the first data segment is not hit locally, the first PCIe switching device sends a pre-read request to the second PCIe switching device which is close to the PCIe destination end, to instruct the second PCIe switching device to provide, in a Posted data transmission mode in advance, multiple data segments of the PCIe destination end to the first PCIe switching device, wherein the multiple data segments include the first data segment.
26. The second PCIe switching device receives a pre-read request sent by the first PCIe switching device, and reads, according to the pre-read request, the multiple data segments including the first data segment from the PCIe destination end.
27. The second PCIe switching device provides the multiple data segments including the first data segment to the first PCIe switching device in the Posted data transmission mode.
28. The first PCIe switching device locally saves the multiple data segments provided by the second PCIe switching device, and returns the first data segment, as response data of the first read request, to the PCIe request end.
29. The PCIe request end receives the response data, and continues to send subsequent read requests in the Non-Posted data transmission mode when the number of requests on a PCIe link does not reach a maximum number.

In the step 21, the PCIe request end sends the read request on the PCIe link in the Non-Posted data transmission mode, and in order to ensure the stability of data transmission on the PCIe link, it is necessary to ensure that the total number of unresponsive read requests on the current PCIe link is not greater than the configured maximum number. Based on this, before the PCIe request end sends the current read request each time, the PCIe request end may determine whether the total number of current unresponsive read requests on the PCIe link has reached the maximum number; if the maximum number is not reached, the PCIe request end sends the current read request in the Non-Posted data transmission mode, and waits for the PCIe destination end to return response data for the current read request. For ease of description and distinction, the read request currently sent by the PCIe request end is referred to as the first read request.

In the step 22, if the first PCIe switching device is a DPU device or a PCIe switch directly connected to the PCIe request end, the first read request sent by the PCIe request end may directly reach the first PCIe switching device; and if the first PCIe switching device is a DPU device or a PCIe switch indirectly connected to the PCIe request end, the first read request sent by the PCIe request end may be sent to the first PCIe switching device through the DPU device or the PCIe switch directly connected to the PCIe request end.

In the steps 23-27, after receiving the first read request, the first PCIe switching device does not directly forward the first read request to the downstream device, but first determines whether the first data segment requested by the first read request exists locally.

If the first data segment exists locally, the first data segment is returned to the PCIe request end as response data of the first read request. In this case, because the first read request may be responded in the first PCIe switching device which is close to the PCIe request end, the response delay of the read request may be reduced, so that the number of unresponsive (on the fly) read requests existing on the PCIe link will not be too many, and the bandwidth utilization of the PCIe link will be ensured. The locally existing first data segment is provided by the second PCIe switching device to the first PCIe switching device in the Posted data transmission mode in advance before the first read request reaches the first PCIe switching device. Before the first read request reaches the first PCIe switching device, the process of providing, by the second PCIe switching device, the first data segment to the first PCIe switching device in the Posted data transmission mode in advance before the first read request reaches the first PCIe switching device is the same as the following process of providing, by the second PCIe switching device, other data segments to the first PCIe switching device in the Posted data transmission mode in advance, and may be found in the description below.

If the first data segment does not exist locally, the first PCIe switching device does not directly forward the first read request to the second PCIe switching device, but sets the first read request to a pending status, and sends a pre-read request to the second PCIe switching device. The pre-read request here is different from the first read request, and the pre-read request is used to instruct the second PCIe switching device to provide, in the Posted data transmission mode in advance, multiple data segments of the PCIe destination end to the first PCIe switching device, and the multiple data segments include the first data segment and at least one other data segment. The at least one other data segment is a data segment that needs to be requested by a subsequent read request, for example, it may be a data segment after the first data segment.

Optionally, the first PCIe switching device may carry data volume descriptive information instructing to read multiple data segments, in the pre-read request. The data volume descriptive information may instruct the second PCIe switching device to read multiple data segments. In an optional embodiment, the data volume descriptive information may be the number of data segments, and the number is greater than or equal to 2, for example, it may be 2, 3, 4, 5, or the like. In another optional embodiment, the data volume descriptive information may be a specified data volume size, such as 4 KB or 2 MB, and the data volume size is at least greater than or equal to the size of two data segments. The size of each data segment is fixed, such as 64 or 128 bytes. Further, the start address of the first data segment may also be carried in the pre-read request, so that the second PCIe switching device knows to start reading data from which position. Further, based on the number of the multiple data segments or the specified data volume size carried in the pre-read request, the second PCIe switching device may determine which data segments need to be read.

Optionally, as shown in FIG. 1a, the first PCIe switching device may send the pre-read request to the second PCIe switching device through other PCIe switching devices. Or, as shown in FIG. 1b, the first PCIe switching device may send the pre-read request to the second PCIe switching device through DPU devices and the PCIe cable between the DPU devices. Or, as shown in FIG. 1c, the first PCIe switching device may send the pre-read request to the second PCIe switching device through DPU devices and the Internet between the DPU devices.

On one hand, after the second PCIe switching device receives the pre-read request, according to the instruction of the pre-read request, the second PCIe switching device acquires and reads multiple data segments from the PCIe destination end. In order to make the PCIe destination end unaware, the second PCIe switching device sequentially sends multiple second read requests to the PCIe destination end in the Non-Posted data transmission mode, and each of the second read requests is used to request one data segment of the multiple data segments; and the PCIe destination end reads the corresponding data segments according to the second read requests sent by the second PCIe switching device, and returns the read data segments, as response data, to the second PCIe switching device, and finally the second PCIe switching device obtains the multiple data segments. On the other hand, whenever the second PCIe switching device receives one data segment returned by the PCIe destination end, the second PCIe switching device will also provide the data segment to the first PCIe switching device in the Posted data transmission mode according to the instruction of the pre-read request. Specifically, providing the data segment to the first PCIe switching device in the Posted data transmission mode includes: carrying the data segment in a Posted write request and sending it to the first PCIe switching device. Optionally, the Posted write request may be a memory write request, to write the data segment into the cache of the first PCIe switching device. The first PCIe switching device may store the data segment provided by the second PCIe switching device in a cache mode, but is not limited to this.

The first PCIe switching device sequentially receives the first data segment and other data segments returned by the second PCIe switching device, and after receiving the first data segment, the first PCIe switching device may return the first data segment, as response data of the first read request, to the PCIe request end; further, after receiving the other data segments, the first PCIe switching device may save the other data segments locally, so that when the PCIe request end sends a subsequent read request, the PCIe request end may directly hit the data segment for the subsequent read request locally and return the data segment, as the response data, to the PCIe request end. For the PCIe request end, after receiving the response data, the response data sequentially passes through a physical layer and a link layer of the PCIe request end to a transaction layer, the payload (i.e., the first data segment or other data segments) of the response data is parsed out in the transaction layer, and then the first data segment or other data segments are reported to an application layer (or a software layer); and, at the application layer (or the software layer), the first data segment or other data segments are processed correspondingly. The corresponding processing at the application layer (or the software layer) includes but is not limited to: recording the first data segment or other data segments read from the cache of the first PCIe switching device, and performing calculation, sorting, knowledge mining, voice outputting, playing, displaying, composition and/or delay, and various statistics on data volume or arrival time on these data segments; further, the priority and/or storage duration of subsequent cached data storage may also be adjusted according to the statistical results.

It may be seen from the above that during one pre-read, the second PCIe switching device may return multiple data segments to the first PCIe switching device in the Posted data transmission mode, wherein the Posted data transmission mode does not need to wait for the first PCIe switching device to return response data, and the transmission efficiency is high. Returning the multiple data segments to the first PCIe switching device may be used by the first PCIe switching device to satisfy local hit operations of the multiple read requests from the PCIe request end, the response speed of these read requests is improved, the response delay is reduced, and the bandwidth utilization of the PCIe link is improved.

In the embodiment of the present application, the mode in which the first PCIe switching device sends a pre-read request to the second PCIe switching device is not limited. For example, in an optional embodiment, the first PCIe switching device sends a pre-read request to the second PCIe switching device in the Posted data transmission mode; in this embodiment, after sending the pre-read request, the first PCIe switching device does not need to wait for the second PCIe switching device to return response data, which may save link delay. In another optional embodiment, the first PCIe switching device sends a pre-read request to the second PCIe switching device in the Non-Posted data transmission mode; in this embodiment, after the second PCIe switching device receives the pre-read request, the second PCIe switching device needs to return response data to the first PCIe switching device. Optionally, after the second PCIe switching device receives the pre-read request, the second PCIe switching device may return a response data without payload to the first PCIe switching device, and this response data is mainly used to notify the first PCIe switching device that the pre-read request has been successfully received.

In an embodiment of the present application, data transmission is performed on the PCIe link in the form of TLP. Based on this, the first read request, the pre-read request, the second read request and the write request in the foregoing embodiments may be carried by the TLP. For the ease of description, the TLP that carries the first read request, the second read request and the pre-read request is referred to as a Read TLP for short, and the Read TLP is sent in the Non-Posted data transmission mode; correspondingly, the TLP that carries the write request is referred to as a Write TLP, and the Write TLP is sent in the Posted data transmission mode. In view of this, converting the Non-Posted data transmission mode into the Posted data transmission mode of the opposite end may be understood as: converting the Read TLP to the Write TLP; correspondingly, the transmission mode converter may also be referred to as a TLP converter. The data transmission method based on the TLP includes the following steps:

Firstly, the PCIe request end generates a Read TLP, and sends the Read TLP to the PCIe destination end through a PCIe link, to request the first data segment from the PCIe destination end. The first data segment is the payload of a TLP, and its size may be 64 or 128 bytes. The packet header of the Read TLP includes the ID of the PCIe request end (indicating the sender of the Read TLP), the ID of the PCIe destination end (indicating the receiver of the Read TLP), and the address of addressing (indicating the storage address of the first data segment on the PCIe destination end), the tag number of the TLP sent currently, the type of the TLP, and other information. The type of the TLP indicates the transaction type to which the Read TLP belongs, for example, it may be a memory read request, an IO read request, or a configuration read request, etc., which indirectly reflects that the Read TLP is a Non-Posted transaction and needs to be transmitted in the Non-Posted data transmission mode.

The Read TLP reaches the first PCIe switching device, close to the PCIe request end, on the PCIe link firstly before reaching the PCIe destination end. The first PCIe switching device receives the Read TLP from the PCIe request end, does not forward it to its downstream device, but sets the Read TLP as pending, and decapsulates the Read TLP to obtain the ID of the PCIe request end, the start address of the first data segment, the tag number of the TLP currently sent, and the type of the TLP, etc. The first PCIe switching device may determine, according to the start address of the first data segment, whether the first data segment exists in the local cache. If there is the first data segment in the local cache, a Completion TLP whose the payload is the first data segment will be directly returned to the PCIe request end as a response, thereby completing the processing of the Read TLP. At this time, the status of the Read TLP is Completion. If the first data segment does not exist in the local cache, the first PCIe switching device generates, according to both the start address of the first data segment and the data volume descriptive information instructing to read the payloads of multiple TLPs, a new type of a TLP, and sends the new type of the TLP to the second PCIe switching device, to instruct the second PCIe switching device to pre-read multiple data segments from the PCIe destination end and write the multiple data segments into the cache of the first PCIe switching device. In this embodiment, the data volume of a specified size is taken as an example, for example, it may be 4 KB or 2 MB.

The above data volume of the specified size is the size of a data unit read by the application layer each time, that is, the data volume is equivalent to the payloads of multiple TLPs. In this embodiment, the payload of one TLP is regarded as one data segment, so the data volume of the specified size is equivalent to multiple data segments. In this embodiment, the multiple data segments include the first data segment, and other data segments to be read subsequently. The packet header of the TLP of the new type includes the ID of the first PCIe switching device, the address of addressing (pointing to the second PCIe switching device), the type of the TLP, and other information. The type of the TLP indicates that the transaction type to which the TLP belongs is of a pre-read type, the pre-read type is a new type, and the pre-read type of the TLP is a Posted transaction, which needs to be transmitted in the Posted data transmission mode. The TLP of the new type is used to carry a pre-read request.

The second PCIe switching device receives the new type of the TLP, and decapsulates the start address of the first data segment and the data volume of a specified size from the new type of the TLP. The second PCIe switching device determines the number of required Read TLPs and the address of addressing corresponding to the payload of each Read TLP according to the start address of the first data segment, the data volume of the specified size, and the size of the payload of the TLP. Subsequently, the second PCIe switching device generates Read TLPs sequentially, and sends the Read TLPs to the PCIe destination end. In this process, after receiving the Read TLP sent by the second PCIe switching device each time, the PCIe destination end acquires, from a local memory subsystem, the data segment requested by the Read TLP, and adds the acquired data segment as a payload to the Completion TLP and returns the Completion TLP to the second PCIe switching device.

After the second PCIe switching device receives the Completion TLP returned by the PCIe destination end each time, the second PCIe switching device parses out the data segment from the payload of the Completion TLP, and uses the data segment as the payload to generate a Write TLP. The packet header of the Write TLP includes the ID of the first PCIe switching device (indicating the receiver of the Write TLP), the ID of the second PCIe switching device (indicating the sender of the Write TLP), the type of the TLP, and other information. The type of the TLP indicates the transaction type to which the Write TLP belongs, for example, it may be a memory write request, etc., which indirectly reflects that the Write TLP is a Posted transaction and needs to be transmitted in the Posted data transmission mode. The second PCIe switching device sends the Write TLP to the first PCIe switching device.

The first PCIe switching device receives the Write TLP sent by the second PCIe switching device, decapsulates the data segment in the payload from the Write TLP, and stores the data segment in a local cache. If the data segment is the first data segment, the first PCIe switching device will also add the first data segment as a payload to the Completion TLP, and return the Completion TLP to the PCIe request end, thereby completing the processing of the Read TLP sent by the PCIe request end. At this time, the status of the Read TLP is Completion. For other data segments, when the first PCIe switching device receives a subsequent Read TLP sent by the PCIe request end, the first PCIe switching device may directly acquire the data segment required by the subsequent Read TLP from the local cache, and directly add the data segment as the payload to the Completion TLP and return the Completion TLP to the PCIe request end, thereby completing the processing of the subsequent Read TLP. The PCIe request end parses out corresponding data segments from the Completion TLP, caches these data segments firstly, and may perform calculation, sorting, knowledge mining, voice outputting, playing, displaying, composition and/or delay, and various statistics on data volume or arrival time on these data segments; further, the priority and/or storage duration of subsequent cached data storage may also be adjusted according to the statistical results.

The payload of a TLP is 64 B and the data unit read by the application layer each time is 4 KB, which is used as an example, then one pre-read may obtain 64 payloads, and the first PCIe switching device may satisfy next 64 local cache hits of the Read TLPs. Because the Read TLP of the PCIe request end may be hit in time and returned in the first PCIe switching device close to the PCIe request end, the delay is short, so there will not be many unresponsive (on the fly) Read TLPs on the PCIe link, and the PCIe request end may continuously send Read TLPs, which is beneficial to increase the bandwidth utilization the PCIe link, and may reduce the probability of limiting the bandwidth of the PCIe link.

Figure 3:
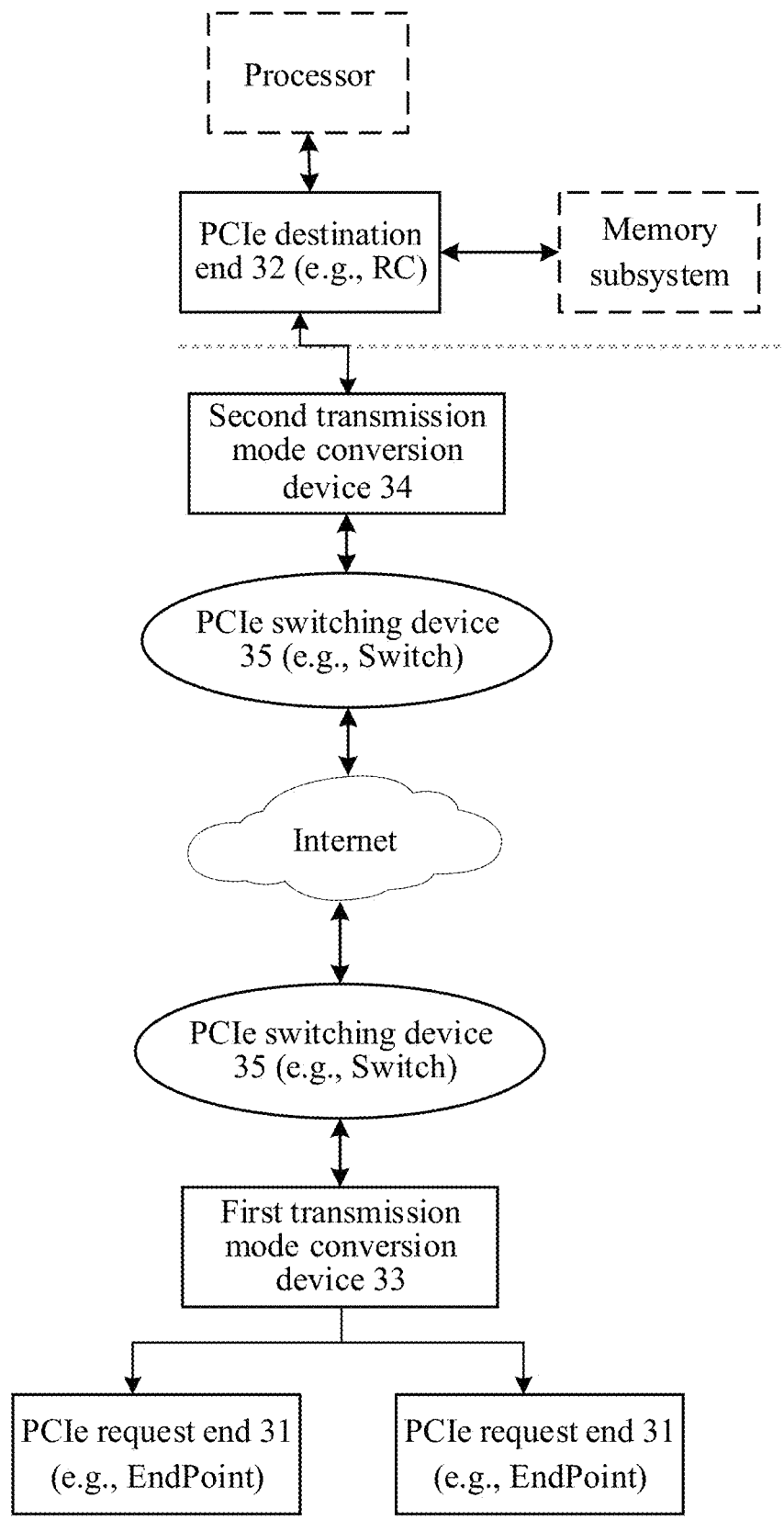
FIG. 3 is a schematic structural diagram of another network system provided by an exemplary embodiment of the present application.

In the foregoing embodiments of the present application, a transmission mode converter implemented in software being embedded in a PCIe switching device, which is close to the PCIe request end and the PCIe destination end, is used as an example, but the transmission mode converter is not limited to software implementation, and may also be implemented in hardware. For example, it may be implemented by using a programmable chip, or by using a Complex Programmable Logic Device (CPLD) or a Field Programmable Gate Array (FPGA). Based on a transmission mode conversion device implemented in hardware, an embodiment of the present application also provides a network system implemented based on a PCIe bus, as shown in FIG. 3, including:

a PCIe request end 31, a PCIe destination end 32, a first transmission mode conversion device 33 connected to the PCIe request end 31, a second transmission mode conversion device 34 connected to the PCIe destination end 32, and a PCIe switching device 35 connected between the first transmission mode conversion device 33 and the second transmission mode conversion device 34. The PCIe request end 31 may be a Root Complex, and the PCIe destination end 32 may be an endpoint device; or, the PCIe request end 31 may be an endpoint device, and the PCIe destination end 32 may be a Root Complex. In terms of stage number, the PCIe switching device 35 in this embodiment may be one-stage, or may be multistage. In terms of implementation, the PCIe switching device 35 in this embodiment may include a PCIe switch, or may include a DPU device. In FIG. 3, the PCIe request end 31 may be an endpoint device, the PCIe destination end 32 is a Root complex, and the PCIe switching devices 35 are multistage and are interconnected through the Internet, which is used as an example for illustration, and is not limited to this.

In this embodiment, the first transmission mode conversion device 33 is configured for receiving a first read request, which is sent by the PCIe request end 31 in the Non-Posted data transmission mode, wherein the first read request is used for requesting a first data segment from the PCIe destination end; then, querying whether the first data segment exists locally; in a case where the first data segment is not hit locally, sending a pre-read request to the second transmission mode conversion device 34, to instruct the second transmission mode conversion device 34 to provide, in the Posted data transmission mode in advance, multiple data segments of the PCIe destination end 32 to the first PCIe switching device 33; and saving locally multiple data segments, including the first data segment, provided by the second transmission mode conversion device 34, and returning the first data segment, as response data of the first read request, to the PCIe request end 31.

Correspondingly, the second transmission mode conversion device 34 is configured for receiving the pre-read request sent by the first transmission mode conversion device 33, and reading, according to the pre-read request, the multiple data segments from the PCIe destination end 32; and providing the multiple data segments to the first transmission mode conversion device 33 in the Posted data transmission mode.

The first transmission mode conversion device 33 and the second transmission mode conversion device 34 cooperate with each other, convert the Non-Posted data transmission mode into the Posted data transmission mode on the PCIe link by pre-reading, so that the delay on the PCIe link may be reduced, the bandwidth utilization of the PCIe link may be improved, and it may make the first transmission mode conversion device and the second transmission mode conversion device unaware. The detailed implementation process in this embodiment is the same or similar to the implementation process of first transmission mode conversion device and the second transmission mode conversion device cooperating with each other in the foregoing embodiments, which may refer to the foregoing embodiments and will not described repeatedly again.

In each of the foregoing embodiments, the first PCIe switching device or the first transmission mode conversion device may enable the solution of "converting a Non-Posted data transmission mode into a Posted data transmission mode by pre-reading" by default, or the solution may be enabled as needed when necessary. Some examples are as follows:

In some application scenarios, the first PCIe switching device or the first transmission mode conversion device may monitor the overall delay of the PCIe request end; when receiving the first read request sent by the PCIe request end, the first PCIe switching device or the first transmission mode conversion device may first determine whether the overall delay of the PCIe request end is greater than a set delay threshold, if the overall delay of the PCIe request end is greater than the set delay threshold, the first PCIe switching device or the first transmission mode conversion device enables the solution of "converting a Non-Posted data transmission mode into a Posted data transmission mode by pre-reading" is enabled. That is, the first PCIe switching device or the first transmission mode conversion device determines whether the first data segment is hit locally. In a case where the first data segment is hit locally, the first data segment is returned to the PCIe request end as response data of the first read request; and in a case where the first data segment is not hit locally, a pre-read request is sent to a second processing device located on the PCIe link, to instruct the second processing device to provide, in the Posted data transmission mode in advance, multiple data segments of the PCIe destination end to the first processing device. The multiple data segments provided by the second processing device are saved locally, and the first data segment is returned to the PCIe request end as the response data of the first read request.

In some other application scenarios, a time interval of enabling the solution of "converting a Non-Posted data transmission mode into a Posted data transmission mode by pre-reading" may be set in advance, and the solution may be enabled on schedule. Based on this, when the first PCIe switching device or the first transmission mode conversion device receives the first read request sent by PCIe request end, the first PCIe switching device or the first transmission mode conversion device may first determine whether the time when the first read request is received belongs to the set time interval, if the time when the first read request is received belongs to the set time interval, the solution of "converting a Non-Posted data transmission mode into a Posted data transmission mode by pre-reading" is enabled. That is, the first PCIe switching device or the first transmission mode conversion device determines whether the first data segment is hit locally. In a case where the first data segment is hit locally, the first data segment is returned to the PCIe request end as response data of the first read request; and in a case where the first data segment is not hit locally, a pre-read request is sent to a second processing device located on the PCIe link, to instruct the second processing device to provide, in the Posted data transmission mode in advance, multiple data segments of the PCIe destination end to the first processing device. The multiple data segments provided by the second processing device are saved locally, and the first data segment is returned to the PCIe request end as the response data of the first read request.

In some other application scenarios, applications that need to enable the solution of "converting a Non-Posted data transmission mode into a Posted data transmission mode by pre-reading" may be set in advance, and designated flags may be added to read requests corresponding to these applications. Based on this, when the first PCIe switching device or the first transmission mode conversion device receives the first read request sent by PCIe request end, the first PCIe switching device or the first transmission mode conversion device may first determine whether the first read request carries a designated flag, if the first read request carries the designated flag, the solution of "converting a Non-Posted data transmission mode into a Posted data transmission mode by pre-reading" is enabled. That is, the first PCIe switching device or the first transmission mode conversion device determines whether the first data segment is hit locally. In a case where the first data segment is hit locally, the first data segment is returned to the PCIe request end as response data of the first read request; and in a case where the first data segment is not hit locally, a pre-read request is sent to a second processing device located on the PCIe link, to instruct the second processing device to provide, in the Posted data transmission mode in advance, multiple data segments of the PCIe destination end to the first processing device. The multiple data segments provided by the second processing device are saved locally, and the first data segment is returned to the PCIe request end as the response data of the first read request.

In the foregoing enumerated scenarios, if the condition of enabling the solution of "converting a Non-Posted data transmission mode into a Posted data transmission mode by pre-reading" is not satisfied, that is, the result of the determination is no, the first read request may be processed in the Non-Posted data transmission mode. That is, the first PCIe switching device or the first transmission mode conversion device may forward the first read request to the PCIe destination end through the downstream device. After the PCIe destination end acquires data segments corresponding to the first read request, the PCIe destination end returns the data segments, as response data, to the PCIe request end through the respective device located on the PCIe link.

Figure 4A:
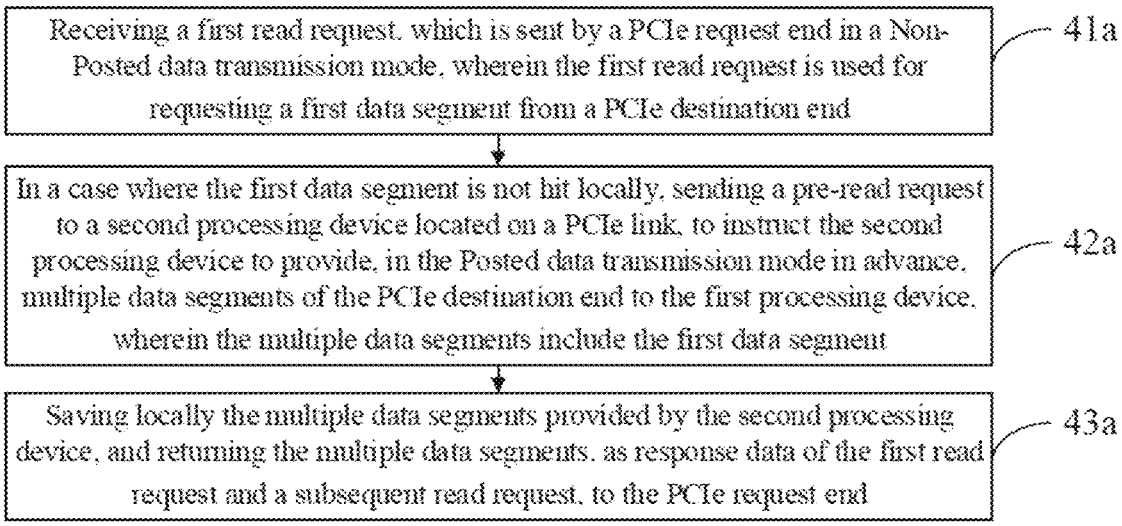
FIG. 4a is a schematic flow chart of a data transmission method provided by an exemplary embodiment of the present application.

FIG. 4a is a schematic flow chart of a data transmission method provided by an exemplary embodiment of the present application. This embodiment is described from the point of view of a first processing device, close to a PCIe request end, on a PCIe link, wherein the first processing device may be a first PCIe switching device or a first transmission mode conversion device. As shown in FIG. 4a, the method includes the following steps:

41a, receiving a first read request, which is sent by a PCIe request end in a Non-Posted data transmission mode, wherein the first read request is used for requesting a first data segment from a PCIe destination end.

42a, in a case where the first data segment is not hit locally, sending a pre-read request to a second processing device located on a PCIe link, to instruct the second processing device to provide, in the Posted data transmission mode in advance, multiple data segments of the PCIe destination end to the first processing device, wherein the multiple data segments include the first data segment.

43a, saving locally the multiple data segments provided by the second processing device, and returning the first data segment, as response data of the first read request, to the PCIe request end.

In an optional embodiment, the method further includes: in a case where the first data segment is hit locally, returning the first data segment, as response data of the first read request, to the PCIe request end.

In an optional embodiment, the sending the pre-read request to the second processing device located on the PCIe link, includes: sending the pre-read request to the second processing device located on the PCIe link in the Posted data transmission mode.

Further optionally, the sending the pre-read request to the second processing device located on the PCIe link in the Posted data transmission mode, includes: decapsulating a start address of the first data segment from the first read request; generating, according to both the start address of the first data segment and data volume descriptive information instructing to read the multiple data segments, a new type of a TLP; and sending the new type of the TLP to the second processing device in the Posted data transmission mode, wherein a type field in the new type of the TLP is of a pre-read type.

In an optional embodiment, after receiving the first read request, the method further includes: determining whether an overall delay of the PCIe request end is greater than a set delay threshold, and in a case where the overall delay of the PCIe request end is greater than the set delay threshold, executing whether to locally hit the first data segment as well as executing a subsequent operation; or, determining whether a time when the first read request is received belongs to a set time interval, and in a case where the time when the first read request is received belongs to the set time interval, executing whether to locally hit the first data segment as well as executing a subsequent operation; or, determining whether the first read request carries a designated flag, and in a case where the first read request carries the designated flag, executing whether to locally hit the first data segment as well as executing a subsequent operation.

Figure 4B:
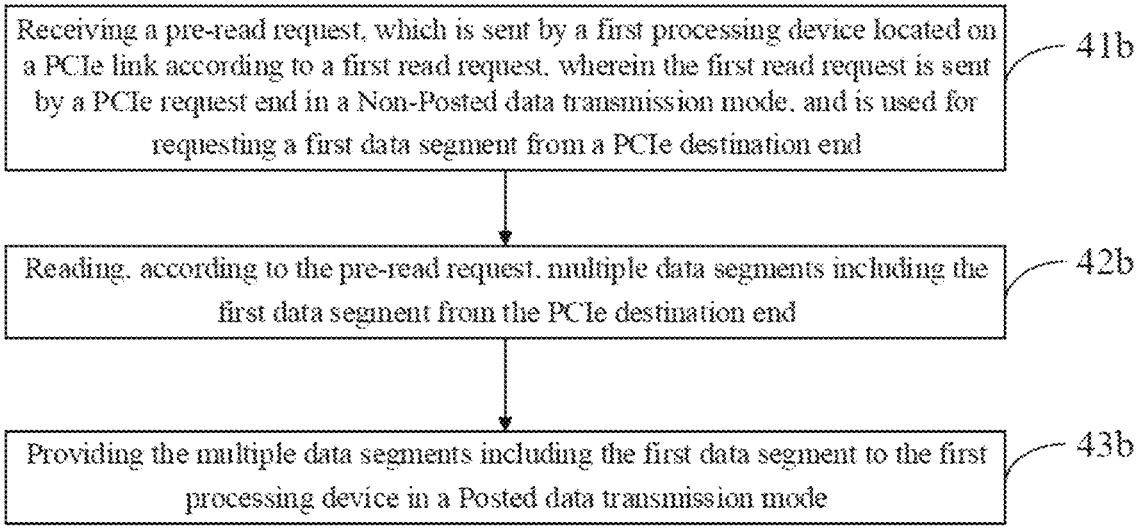
FIG. 4b is a schematic flow chart of another data transmission method provided by an exemplary embodiment of the present application.

FIG. 4b is a schematic flow chart of another data transmission method provided by an exemplary embodiment of the present application. This embodiment is described from the point of view of a second processing device, close to a PCIe destination end, on a PCIe link, wherein the second processing device may be a second PCIe switching device or a second transmission mode conversion device. As shown in FIG. 4b, the method includes the following steps: 41b, receiving a pre-read request, which is sent by a first processing device located on a PCIe link according to a first read request, wherein the first read request is sent by a PCIe request end in a Non-Posted data transmission mode, and is used for requesting a first data segment from a PCIe destination end; 42b, reading, according to the pre-read request, multiple data segments including the first data segment from the PCIe destination end; and 43b, providing the multiple data segments including the first data segment to the first processing device in a Posted data transmission mode.

In an optional embodiment, the reading, according to the pre-read request, multiple data segments including the first data segment from the PCIe destination end, includes: reading, according to the pre-read request, the first data segment and other data segments of the multiple data segments sequentially from the PCIe destination end in the Non-Posted data transmission mode.

Correspondingly, the providing the multiple data segments including the first data segment to the first processing device in the Posted data transmission mode, includes: whenever one data segment is read from the PCIe destination end, carrying the read data segment in a Posted write request, and sending the Posted write request to the first processing device.

In the foregoing embodiments shown in FIG. 4a and FIG. 4b, the first processing device close to the PCIe request end and the second processing device close to the PCIe destination end cooperate with each other, convert the Non-Posted data transmission mode into the Posted data transmission mode on the PCIe link by pre-reading, which may reduce the delay on the PCIe link, increase the bandwidth utilization of the PCIe link, and make the PCIe request end and the PCIe destination end unaware.

It should be noted that the closer the first processing device is to the PCIe request end, the better. Preferably, the first processing device is a PCIe switching device or a transmission mode conversion device, which is directly connected to the PCIe request end. In the case of being hit locally, the delay between the first processing device and the PCIe request end is the shortest, which may reduce the delay on the PCIe link greatly, increase the bandwidth utilization of the PCIe link, and reduce the probability of limiting bandwidth of the PCIe link.

It should be noted that some of the processes described in the above embodiments and the accompanying drawings include multiple operations in a specific order, but it should be clearly understood that these operations may not be performed in the order in which they appear, or may be performed in parallel. The serial numbers of the operations, such as 41a, 42a, etc., are only used to distinguish different operations, and the serial numbers themselves do not represent any execution order. Additionally, these processes may include more or fewer operations, and these operations may be performed sequentially or in parallel. It should be noted that the descriptions such as "first" and "second" in this document are used to distinguish different messages, devices, modules, and the like, and do not represent the sequential order or define that the "first" and "second" are in different types.

Figure 5A:
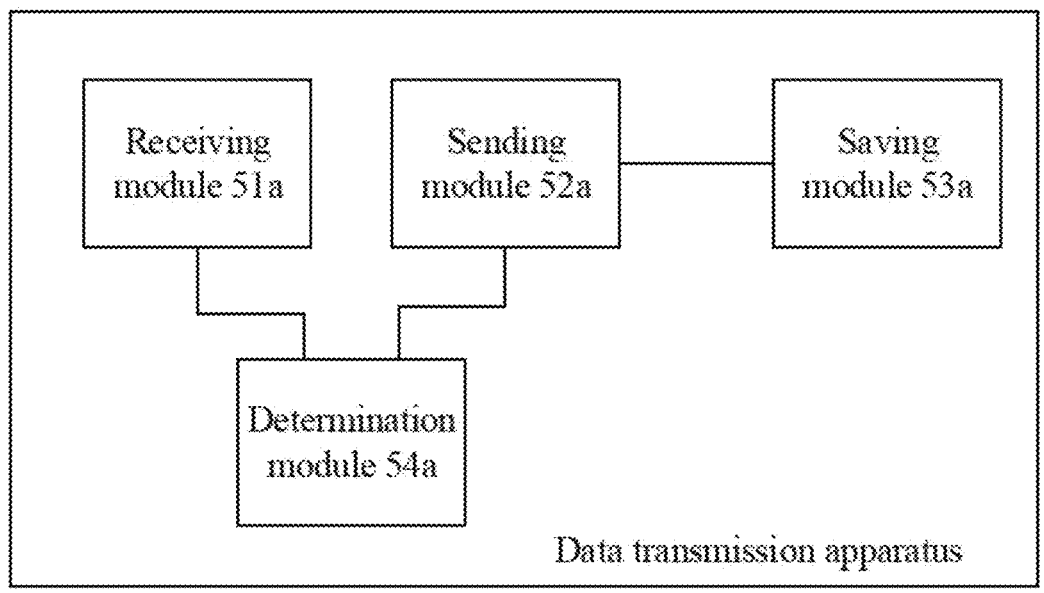
FIG. 5a is a schematic structural diagram of a data transmission apparatus provided by an exemplary embodiment of the present application.

FIG. 5a is a schematic structural diagram of a data transmission apparatus provided by an exemplary embodiment of the present application. As shown in FIG. 5a, the data transmission apparatus includes: a receiving module 51a, a sending module 52a, and a saving module 53a.

The receiving module 51a is configured for receiving a first read request, which is sent by a PCIe request end in a Non-Posted data transmission mode, wherein the first read request is used for requesting a first data segment from a PCIe destination end. The sending module 52a is configured for, in a case where the first data segment is not hit locally, sending a pre-read request to a second processing device located on the PCIe link, to instruct the second processing device to provide, in a Posted data transmission mode in advance, multiple data segments of the PCIe destination end to a first processing device, wherein the multiple data segments include the first data segment. The saving module 53a is configured for saving locally the multiple data segments provided by the second processing device, and returning the first data segment, as response data of the first read request, to the PCIe request end.

In an optional embodiment, the sending module 52a is further configured for, in a case where the first data segment is hit locally, returning the first data segment, as the response data of the first read request, to the PCIe request end.

In an optional embodiment, when the sending module 52a sends the pre-read request, the sending module 52a is specifically configured for sending the pre-read request to the second processing device located on the PCIe link in the Posted data transmission mode.

Further optionally, the sending module 52a is specifically configured for decapsulating a start address of the first data segment from the first read request; generating, according to both the start address of the first data segment and data volume descriptive information instructing to read the multiple data segments, a new type of a TLP; sending the new type of the TLP to the second processing device in the Posted data transmission mode, wherein a type field in the new type of the TLP is of a pre-read type.

In an optional embodiment, as shown in FIG. 5a, the data transmission apparatus further includes a determination module 54a. The determination module 54a is configured for determining whether an overall delay of the PCIe request end is greater than a set delay threshold when the receiving module 51a receives the first read request, and in a case where the overall delay of the PCIe request end is greater than the set delay threshold, executing whether to locally hit the first data segment and triggering the other module to execute a subsequent operation. Or, the determination module 54a is configured for determining whether a time when the first read request is received belongs to a set time interval when the receiving module 51a receives the first read request, and in a case where the time when the first read request is received belongs to the set time interval, executing whether to locally hit the first data segment and triggering the other module to execute a subsequent operation. Or, the determination module 54a is configured for determining whether the first read request carries a designated flag when the receiving module 51a receives the first read request, and in a case where the first read request carries the designated flag, executing whether to locally hit the first data segment and triggering the other module to execute a subsequent operation.

In an optional embodiment, the data transmission apparatus may be implemented by being embedded in a PCIe switching device connected to the PCIe request end.

Figure 5B:
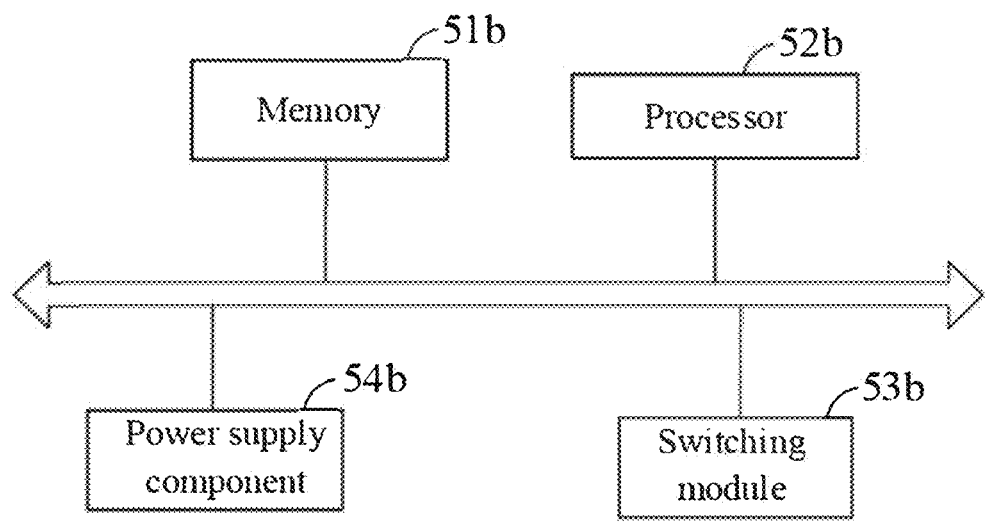
FIG. 5b is a schematic structural diagram of a PCIe switching device provided by an exemplary embodiment of the present application.

The internal functions and structure of the data transmission apparatus are described above, the data transmission apparatus may be implemented as a first PCIe switching device or a first transmission mode conversion device in practice. As shown in FIG. 5b, a PCIe switching device, which may be implemented as a first PCIe switching device located on a PCIe link, includes: a memory 51b, a processor 52b and a switching module 53b. The switching module 53b includes an upstream port and a downstream port, the upstream port is connected to an upstream device, such as a PCIe request end; and the downstream port is connected to a downstream device, such as a next-stage PCIe switching device or an endpoint device.

The memory 51b is configured for storing a computer program, and may be configured for storing various other data to support operations on the PCIe switching device. The examples of these data include any applications or instructions of methods which are used to be performed on the PCIe switching device, messages, photos, videos, etc.

The processor 52b is coupled with the memory 51b, and is configured for executing the computer program in the memory 51b to: receive a first read request, which is sent by a PCIe request end in a Non-Posted data transmission mode, wherein the first read request is used for requesting a first data segment from a PCIe destination end; in a case where the first data segment is not hit locally, send a pre-read request to a second PCIe switching device located on the PCIe link, to instruct the second PCIe switching device to provide, in a Posted data transmission mode in advance, multiple data segments of the PCIe destination end to the first PCIe switching device, wherein the multiple data segments include the first data segment; and save locally the multiple data segments provided by the second PCIe switching device, and returning the first data segment, as response data of the first read request, to the PCIe request end.

In an optional embodiment, the processor 52b is further configured for, in a case where the first data segment is hit locally, returning the first data segment, as the response data of the first read request, to the PCIe request end.

In an optional embodiment, when the processor 52b sends the pre-read request, the processor 52b is specifically configured for sending the pre-read request to the second PCIe switching device located on the PCIe link in the Posted data transmission mode.

Further optionally, the processor 52b is specifically configured for decapsulating a start address of the first data segment from the first read request; generating, according to both the start address of the first data segment and data volume descriptive information instructing to read the multiple data segments, a new type of a TLP; sending the new type of the TLP to the second PCIe switching device in the Posted data transmission mode, wherein a type field in the new type of the TLP is of a pre-read type.

In an optional embodiment, the processor 52b is further configured for, when the first read request is received, determining whether an overall delay of the PCIe request end is greater than a set delay threshold, and in a case where the overall delay of the PCIe request end is greater than the set delay threshold, executing whether to locally hit the first data segment as well as executing a subsequent operation. Or, the processor 52b is further configured for, when the first read request is received, determining whether a time when the first read request is received belongs to a set time interval, and in a case where the time when the first read request is received belongs to the set time interval, executing whether to locally hit the first data segment as well as executing a subsequent operation. Or, the processor 52b is further configured for, when the first read request is received, determining whether the first read request carries a designated flag, and in a case where the first read request carries the designated flag, executing whether to locally hit the first data segment as well as executing a subsequent operation.

Further, as shown in FIG. 5b, the PCIe switching device further includes other modules such as a power supply component 54b, etc. FIG. 5b only gives a part of the modules schematically, but it does not mean that the PCIe switching device only includes the modules shown in FIG. 5b.

An embodiment of the present application also provides a transmission mode conversion device, which has the same implementation structure and function as the PCIe switching device provided by the embodiment of FIG. 5b, and is not described repeatedly again.

Correspondingly, an embodiment of the present application also provides a computer-readable storage medium storing a computer program. When the computer program is executed by a processor, the computer program causes the processor to implement each step of the foregoing method embodiments, which may be performed by the first PCIe switching device or the first transmission mode conversion device.

Figure 6A:
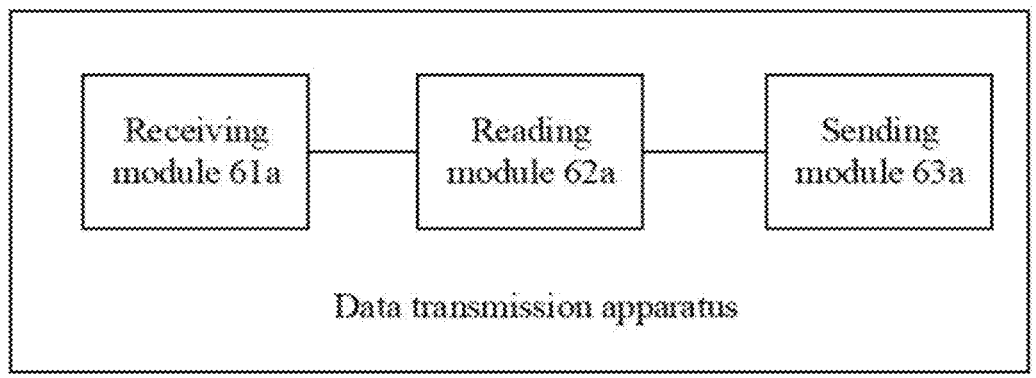
FIG. 6a is a schematic structural diagram of another data transmission apparatus provided by an exemplary embodiment of the present application.

FIG. 6a is a schematic structural diagram of another data transmission apparatus provided by an exemplary embodiment of the present application. As shown in FIG. 6a, the data transmission apparatus includes a receiving module 61a, a reading module 62a and a sending module 63a.

The receiving module 61a is configured for receiving a pre-read request, which is sent by a first processing device located on a PCIe link according to a first read request, wherein the first read request is sent by a PCIe request end in a Non-Posted data transmission mode, and is used for requesting a first data segment from a PCIe destination end. The reading module 62a is configured for reading, according to the pre-read request, multiple data segments including the first data segment from the PCIe destination end. The sending module 63a is configured for providing the multiple data segments including the first data segment to the first processing device in a Posted data transmission mode.

In an optional embodiment, the reading module 62a is specifically configured for reading, according to the pre-read request, the first data segment and other data segments of the multiple data segments sequentially from the PCIe destination end in the Non-Posted data transmission mode.

Correspondingly, the sending module 63a is specifically configured for, whenever the reading module 62a reads one data segment from the PCIe destination end, carrying the read data segment in a Posted write request, and sending the Posted write request to the first processing device.

Figure 6B:
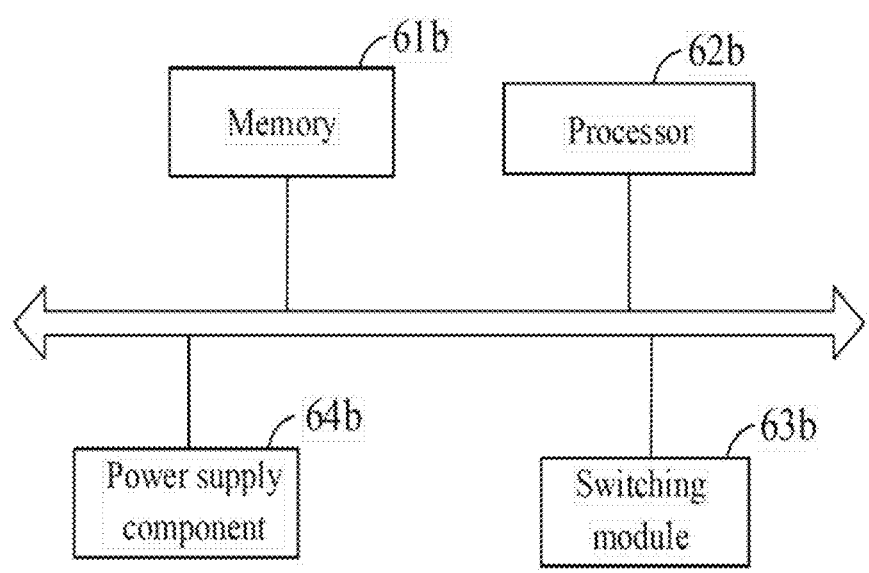
FIG. 6b is a schematic structural diagram of another PCIe switching device provided by an embodiment of the present application.

The internal functions and structure of the data transmission apparatus are described above, the data transmission apparatus may be implemented as a second PCIe switching device or a second transmission mode conversion device in practice. As shown in FIG. 6b, a PCIe switching device, which may be implemented as a second PCIe switching device located on a PCIe link, includes: a memory 61b, a processor 62b and a switching module 63b. The switching module 63b includes an upstream port and a downstream port, the upstream port is connected to an upstream device, such as a PCIe request end; and the downstream port is connected to a downstream device, such as a next-stage PCIe switching device or an endpoint device.

The memory 61b is configured for storing a computer program, and may be configured for storing various other data to support operations on the PCIe switching device. The examples of these data include any applications or instructions of methods which are used to be performed on the PCIe switching device, messages, photos, videos, etc.

The processor 62b is coupled with the memory 61b, and is configured for executing the computer program in the memory 61b to: receive a pre-read request, which is sent by a first PCIe switching device located on a PCIe link according to a first read request, wherein the first read request is sent by a PCIe request end in a Non-Posted data transmission mode, and is used for requesting a first data segment from a PCIe destination end; read, according to the pre-read request, multiple data segments including the first data segment from the PCIe destination end; and provide the multiple data segments including the first data segment to the first PCIe switching device in a Posted data transmission mode.

In an optional embodiment, when the processor 62b reads the multiple data segments, the processor 62b is specifically configured for reading, according to the pre-read request, the first data segment and other data segments of the multiple data segments sequentially from the PCIe destination end in the Non-Posted data transmission mode.

Correspondingly, when the processor 62b provides the multiple data segments to the first PCIe switching device, the processor 62b is specifically configured for, whenever the reading module 62a reads one data segment from the PCIe destination end, carrying the read data segment in a Posted write request, and sending the Posted write request to the first PCIe switching device.

Further, as shown in FIG. 6b, the PCIe switching device further includes other modules such as a power supply component 64b, etc. FIG. 6b only gives a part of the modules schematically, but it does not mean that the PCIe switching device only includes the modules shown in FIG. 6b.

An embodiment of the present application also provides a transmission mode conversion device, which has the same implementation structure and function as the PCIe switching device provided by the embodiment of FIG. 6b, and is not described repeatedly again.

Correspondingly, an embodiment of the present application also provides a computer-readable storage medium storing a computer program. When the computer program is executed by a processor, the computer program causes the processor to implement each step of the foregoing method embodiments, which may be performed by the second PCIe switching device or the second transmission mode conversion device.

The memory in the foregoing embodiments may be implemented by any type of volatile storage device or nonvolatile storage device, or their combination, such as a static random-access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power supply component in the foregoing embodiments provides power to various components in the device where the power supply component is located. The power supply component may include a power management system, one or more power supplies, as well as other components related to generating, managing and distributing the power for the device where the power supply component is located.

Those skilled in the art should understand that the embodiments of the present application may be provided as a method, a system, or a computer program product. Therefore, the present application may take a form of an entirely hardware embodiment, an entirely software embodiment, or an embodiment combining software and hardware. Furthermore, the present application may take the form of a computer program product, which is embodied on one or more computer-usable storage media (including, but not limited to, a disk memory, a CD-ROM, an optical memory, and the like) containing computer-usable program codes.

The present application is described with reference to the flow charts and/or block diagrams of methods, devices (systems) and computer program products according to the embodiments of the present application. It should be understood that the computer program instructions may be used to implement each process and/or each block in the flow charts and/or the block diagrams, and a combination of a process and/or a block in the flow charts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a function specified in one or more processes in the flowcharts and/or in one or more blocks in the block diagrams.

These computer program instructions may also be stored in a computer readable memory that may instruct a computer or another programmable data processing device to work in a specific manner, so that the instructions stored in the computer readable memory generate an artifact that includes an instruction apparatus. The instruction apparatus implements a function specified in one or more processes in the flowcharts and/or in one or more blocks in the block diagrams.

These computer program instructions may also be loaded to a computer or another programmable data processing device, so that a series of operation steps are performed on the computer or another programmable data processing device to generate computer-implemented processing. Therefore, the instructions executed on the computer or another programmable data processing device are used to provide steps for implementing a function specified in one or more processes in the flowcharts and/or in one or more blocks in the block diagrams.

In a typical configuration, a computing device includes one or more processors (CPU), an input/output interface, a network interface, and a memory.

The memory may include a volatile memory, a random-access memory (RAM) and/or a non-volatile memory, and the like in a computer-readable medium, such as a read-only memory (ROM) or a flash random access memory (flash RAM). The memory is an example of the computer-readable media.

The computer-readable media further include permanent and non-permanent, removable and non-removable media employing any method or technique to achieve information storage. The information may be computer readable instructions, data structures, modules of programs, or other data. Examples of computer storage media include, but are not limited to, a phase-change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that may be accessed by a computing device. As defined herein, the computer-readable media do not include transitory media, such as modulated data signals and carriers.

It is also noted that the terms "comprise", "include" or any of their variants are intended to cover non-exclusive inclusion, so that processes, methods, merchandise, or devices, which include a series of elements, not only include those elements, but also include other elements that have not been explicitly listed, or elements that are intrinsic to such processes, methods, merchandise, or devices. In the absence of further limitations, elements that are limited by the phrase "comprise one" do not exclude the existence of additional identical elements in the processes, methods, merchandise, or devices that include the elements.

The above are only embodiments of the present application and are not intended to limit the present application. For those skilled in the art, there may be various modifications and changes to the present application. Any modification, equivalent substitution, improvement, etc. made within the spirit and principle of the present application shall be included in the scope of the claims of the present application.

What is claimed is:

1. A data transmission method, applied to a first processing device located on a Peripheral Component Interconnect express (PCIe) link, wherein the method comprises:
   receiving a first read request, which is sent by a PCIe request end in a Non-Posted data transmission mode, wherein the first read request is used for requesting a first data segment from a PCIe destination end;
   querying whether the first data segment requested by the first read request exists locally;
   determining that the first data segment is not hit locally, sending a pre-read request to a second processing device located on the PCIe link, to instruct the second processing device to provide, in a Posted data transmission mode in advance, a plurality of data segments of the PCIe destination end to the first processing device, wherein the plurality of data segments comprise the first data segment; and
   saving locally the plurality of data segments provided by the second processing device, and returning the first data segment, as response data of the first read request, to the PCIe request end.

2. The method according to claim 1, further comprising:
   determining that the first data segment is hit locally, returning the first data segment, as the response data of the first read request, to the PCIe request end.

3. The method according to claim 1, wherein the sending the pre-read request to the second processing device located on the PCIe link, comprises:
   sending the pre-read request to the second processing device located on the PCIe link in the Posted data transmission mode.

4. The method according to claim 3, wherein the sending the pre-read request to the second processing device located on the PCIe link in the Posted data transmission mode, comprises:
   decapsulating a start address of the first data segment from the first read request;
   generating, according to both the start address of the first data segment and data volume descriptive information instructing to read a plurality of data segments, a new type of a Transaction Layer Packet (TLP); and
   sending the new type of the TLP to the second processing device in the Posted data transmission mode, wherein a type field in the new type of the TLP is of a pre-read type.

5. The method according to claim 1, wherein after receiving the first read request, the method further comprises:
   determining whether an overall delay of the PCIe request end is greater than a set delay threshold, and determining that the overall delay of the PCIe request end is greater than the set delay threshold, executing whether to locally hit the first data segment as well as executing a subsequent operation;
   or,
   determining whether a time when the first read request is received belongs to a set time interval, and determining that the time when the first read request is received belongs to the set time interval, executing whether to locally hit the first data segment as well as executing a subsequent operation;
   or,
   determining whether the first read request carries a designated flag, and determining that the first read request carries the designated flag, executing whether to locally hit the first data segment as well as executing a subsequent operation.

6. The method according to claim 1, wherein the first processing device is a PCIe switching device connected to the PCIe request end, and the second processing device is a PCIe switching device connected to the PCIe destination end;
   or,
   the first processing device is a transmission mode conversion device connected to the PCIe request end, and the second processing device is a transmission mode conversion device connected to the PCIe destination end.

7. A data transmission method, applied to a second processing device located on a Peripheral Component Interconnect express (PCIe) link, wherein the method comprises:
   receiving a pre-read request, which is sent by a first processing device located on the PCIe link according to a first read request, wherein the first read request is sent by a PCIe request end in a Non-Posted data transmission mode, and is used for requesting a first data segment from a PCIe destination end;

reading, according to the pre-read request, a plurality of data segments comprising the first data segment from the PCIe destination end; and providing the plurality of data segments comprising the first data segment to the first processing device in a Posted data transmission mode.

8. The method according to claim 7, wherein the reading, according to the pre-read request, the plurality of data segments comprising the first data segment from the PCIe destination end, comprises:

reading, according to the pre-read request, the first data segment and other data segments of the plurality of data segments sequentially from the PCIe destination end in the Non-Posted data transmission mode.

9. The method according to claim 8, wherein the providing the plurality of data segments comprising the first data segment to the first processing device in the Posted data transmission mode, comprises:

whenever one data segment is read from the PCIe destination end, carrying the read data segment in a Posted write request, and sending the Posted write request to the first processing device.

10. A network system, comprising: a Peripheral Component Interconnect express (PCIe) request end, a PCIe destination end, and a multistage PCIe switching device connected between the PCIe request end and the PCIe destination end; wherein the multistage PCIe switching device at least comprises a first PCIe switching device and a second PCIe switching device;

the first PCIe switching device is configured for receiving a first read request, which is sent by the PCIe request end in a Non-Posted data transmission mode, wherein the first read request is used for requesting a first data segment from the PCIe destination end; in a case where the first data segment is not hit locally, sending a pre-read request to the second PCIe switching device; and saving locally a plurality of data segments, comprising the first data segment, provided by the second PCIe switching device, and returning the first data segment, as response data of the first read request, to the PCIe request end; and the second PCIe switching device is configured for receiving the pre-read request, and reading, according to the pre-read request, the plurality of data segments from the PCIe destination end; and providing the plurality of data segments to the first PCIe switching device in a Posted data transmission mode.

11. The system according to claim 10, wherein the first PCIe switching device is a switch or a Data Processing Unit (DPU) device, which is connected to the PCIe request end; wherein the second PCIe switching device is a switch or a DPU device, which is connected to the PCIe destination end.

12. The system according to claim 10, wherein the first PCIe switching device is connected to the second PCIe switching device through a network;

or, the first PCIe switching device is connected to the second PCIe switching device through another PCIe switching device;

or, the first PCIe switching device is connected to the second PCIe switching device through a PCIe cable.

13. A network system, comprising: a Peripheral Component Interconnect express (PCIe) request end, a PCIe destination end, a first transmission mode conversion device connected to the PCIe request end, a second transmission mode conversion device connected to the PCIe destination end, and a PCIe switching device connected between the first transmission mode conversion device and the second transmission mode conversion device, wherein, the first transmission mode conversion device is configured for receiving a first read request, which is sent by the PCIe request end in a Non-Posted data transmission mode, wherein the first read request is used for requesting a first data segment from the PCIe destination end; in a case where the first data segment is not hit locally, sending a pre-read request to the second transmission mode conversion device; and saving locally a plurality of data segments, comprising the first data segment, provided by the second transmission mode conversion device, and returning the first data segment, as response data of the first read request, to the PCIe request end; and the second transmission mode conversion device is configured for receiving the pre-read request, and reading, according to the pre-read request, the plurality of data segments from the PCIe destination end; and providing the plurality of data segments to the first transmission mode conversion device in a Posted data transmission mode.

14. The system according to claim 13, wherein the first transmission mode conversion device or the second transmission mode conversion device is a programmable chip, or is implemented by a Complex Programmable Logic Device (CPLD) or a Field Programmable Gate Array (FPGA).

15. A Peripheral Component Interconnect express (PCIe) switching device, implemented as a first PCIe switching device located on a PCIe link, wherein the PCIe switching device comprises: a memory and a processor; and the memory is configured for storing a computer program; and the processor is coupled with the memory, and is configured for executing the computer program to:

receive a first read request, which is sent by a PCIe request end in a Non-Posted data transmission mode, wherein the first read request is used for requesting a first data segment from a PCIe destination end;

in a case where the first data segment is not hit locally, send a pre-read request to a second PCIe switching device located on the PCIe link, to instruct the second PCIe switching device to provide, in a Posted data transmission mode in advance, a plurality of data segments of the PCIe destination end to the first PCIe switching device, wherein the plurality of data segments comprise the first data segment; and save locally the plurality of data segments provided by the second PCIe switching device, and returning the first data segment, as response data of the first read request, to the PCIe request end.

16. A Peripheral Component Interconnect express (PCIe) switching device, implemented as a second PCIe switching device located on a PCIe link, wherein the PCIe switching device comprises: a memory and a processor; and the memory is configured for storing a computer program; and the processor is coupled with the memory, and is configured for executing the computer program to:

receive a pre-read request, which is sent by a first PCIe switching device located on the PCIe link according to a first read request, wherein the first read request is sent by a PCIe request end in a Non-Posted data transmission mode, and is used for requesting a first data segment from a PCIe destination end;

read, according to the pre-read request, a plurality of data segments comprising the first data segment from the PCIe destination end; and provide the plurality of data segments comprising the first data segment to the first PCIe switching device in a Posted data transmission mode.

17. A computer-readable storage medium storing a computer program, wherein the computer program, when executed by a processor, causes the processor to implement operations of the method according to claim 1.

18. The method according to claim 2, wherein after receiving the first read request, the method further comprises:
determining whether an overall delay of the PCIe request end is greater than a set delay threshold, and determining that the overall delay of the PCIe request end is greater than the set delay threshold, executing whether to locally hit the first data segment as well as executing a subsequent operation;
or,
determining whether a time when the first read request is received belongs to a set time interval, and determining that the time when the first read request is received belongs to the set time interval, executing whether to locally hit the first data segment as well as executing a subsequent operation;
or,
determining whether the first read request carries a designated flag, and determining that the first read request carries the designated flag, executing whether to locally hit the first data segment as well as executing a subsequent operation.

19. The method according to claim 3, wherein after receiving the first read request, the method further comprises:
determining whether an overall delay of the PCIe request end is greater than a set delay threshold, and determining that the overall delay of the PCIe request end is greater than the set delay threshold, executing whether to locally hit the first data segment as well as executing a subsequent operation;
or,
determining whether a time when the first read request is received belongs to a set time interval, and determining that the time when the first read request is received belongs to the set time interval, executing whether to locally hit the first data segment as well as executing a subsequent operation;
or,
determining whether the first read request carries a designated flag, and determining that the first read request carries the designated flag, executing whether to locally hit the first data segment as well as executing a subsequent operation.

20. The method according to claim 4, wherein after receiving the first read request, the method further comprises:
determining whether an overall delay of the PCIe request end is greater than a set delay threshold, and determining that the overall delay of the PCIe request end is greater than the set delay threshold, executing whether to locally hit the first data segment as well as executing a subsequent operation;
or,
determining whether a time when the first read request is received belongs to a set time interval, and determining that the time when the first read request is received belongs to the set time interval, executing whether to locally hit the first data segment as well as executing a subsequent operation;
or,
determining whether the first read request carries a designated flag, and determining that the first read request carries the designated flag, executing whether to locally hit the first data segment as well as executing a subsequent operation.

* * * * *